(12) United States Patent
Yim et al.

(10) Patent No.: US 10,394,089 B2
(45) Date of Patent: Aug. 27, 2019

(54) DISPLAY SUBSTRATE AND METHOD OF MANUFACTURING THE SAME

(71) Applicant: Samsung Display Co., Ltd., Yongin-Si, Gyeonggi-Do (KR)

(72) Inventors: Taekyung Yim, Seoul (KR); Jang-Il Kim, Asan-si (KR); Hoon Kim, Ansan-si (KR); Keunwoo Park, Incheon (KR); Dong-Chul Shin, Hwaseong-si (KR); Kichul Shin, Seongnam-si (KR); Suwan Woo, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 69 days.

(21) Appl. No.: 15/613,872

(22) Filed: Jun. 5, 2017

(65) Prior Publication Data

US 2018/0017831 A1    Jan. 18, 2018

(30) Foreign Application Priority Data

Jul. 15, 2016  (KR) ........................ 10-2016-0090162

(51) Int. Cl.
*G02F 1/1362* (2006.01)
*G02F 1/1368* (2006.01)
(Continued)

(52) U.S. Cl.
CPC ...... *G02F 1/134309* (2013.01); *G02F 1/1368* (2013.01); *G02F 1/1362* (2013.01);
(Continued)

(58) Field of Classification Search
CPC ... G02F 2001/134345; G02F 1/134309; G02F 2201/123; G02F 1/133345;
(Continued)

(56) References Cited

U.S. PATENT DOCUMENTS

| 2017/0059947 A1* | 3/2017 | Kim | G02F 1/134309 |
| 2017/0131599 A1* | 5/2017 | Yim | G02F 1/134309 |
| 2017/0153517 A1* | 6/2017 | Shin | G02F 1/134336 |

FOREIGN PATENT DOCUMENTS

| KR | 100733213 B1 | 11/2004 |
| KR | 100869285 B1 | 9/2007 |
| KR | 100894366 B1 | 3/2008 |

* cited by examiner

*Primary Examiner* — Huyen L Ngo
(74) *Attorney, Agent, or Firm* — Cantor Colburn LLP

(57) ABSTRACT

A display substrate includes a base substrate, a switching device, and a pixel electrode including a first sub pixel electrode and a second sub pixel electrode. The first sub pixel electrode includes an internal electrode and an external electrode. The internal electrode includes a support electrode portion extending in a second direction, and a horizontal internal branch electrode portion extending in a first direction. The external electrode includes a horizontal external branch electrode portion disposed outside the internal electrode and extending in the first direction, and a vertical external branch electrode portion disposed outside the internal electrode and extending in the second direction. The second sub pixel electrode is adjacent to the first sub pixel electrode and has a shape symmetrical to the first sub pixel electrode.

20 Claims, 39 Drawing Sheets

(51) Int. Cl.
*G02F 1/1343* (2006.01)
*G02F 1/1337* (2006.01)

(52) U.S. Cl.
CPC .................. *G02F 1/133707* (2013.01); *G02F 2001/134318* (2013.01)

(58) Field of Classification Search
CPC ... G02F 2001/136222; G02F 1/133514; G02F 1/136227; G02F 1/1368; G02F 1/1362; G02F 1/133707; G02F 2001/134318
See application file for complete search history.

DISPLAY SUBSTRATE AND METHOD OF MANUFACTURING THE SAME

This application claims priority to Korean Patent Application No. 10-2016-0090162, filed on Jul. 15, 2016, and all the benefits accruing therefrom under 35 U.S.C. § 119, the content of which in its entirety is herein incorporated by reference.

BACKGROUND

1. Field

Exemplary embodiments of the invention relate to a substrate, and more particularly to a display substrate and a method of manufacturing the display substrate.

2. Description of the Related Art

As demands on various types of display devices have recently increased with a development of information technology, studies on display devices, such as a liquid crystal display ("LCD") apparatus, a plasma display panel ("PDP"), a field emission display ("FED") apparatus, and electrophoretic display ("EPD") apparatus and an organic light emitting diode ("OLED") display apparatus, have been actively conducted.

In general, a display apparatus includes a display panel and a display panel driving part. The display panel includes a plurality of gate lines, a plurality of data lines, and a plurality of sub pixels. The display panel driving part includes a gate driving part providing gate signal to the plurality of gate lines, and a data driving part providing data voltages to the plurality of data lines.

A pixel electrode of the LCD apparatus may include indium tin oxide ("ITO") or indium zinc oxide ("IZO"). The pixel electrode is formed by forming an indium tin layer or an indium zinc oxide layer, and then patterning the indium tin oxide layer or the indium zinc oxide layer.

SUMMARY

In a process for pattering an indium tin oxide or an indium zinc oxide, shear stress is generated, and therefore a phase delay is generated in an edge portion of the pixel electrode. Thus, a side visibility of the liquid crystal display ("LCD") apparatus may be decreased.

Exemplary embodiments of the invention provide a display substrate which improves a transmission rate and a side visibility.

Exemplary embodiments of the invention also provide a method of manufacturing the above-mentioned display substrate.

According to an exemplary embodiment of the invention, a display substrate includes a base substrate, a switching device, and a pixel electrode. The switching device is disposed on the base substrate, and includes a gate electrode electrically connected to a gate line extending in a first direction, a source electrode electrically connected to a data line extending in a second direction perpendicular to the first direction, and a drain electrode spaced apart from the source electrode. The pixel electrode is electrically connected to the switching device, and includes a first sub pixel electrode and a second sub pixel electrode. The first sub pixel electrode includes an internal electrode and an external electrode. The internal electrode includes a support electrode portion extending in the second direction, and a horizontal internal branch electrode portion extending in the first direction. The external electrode includes a horizontal external branch electrode portion disposed outside the internal electrode and extending in the first direction, and a vertical external branch electrode portion disposed outside the internal electrode and extending in the second direction. The second sub pixel electrode is adjacent to the first sub pixel electrode and has a shape symmetrical to the first sub pixel electrode.

In an exemplary embodiment, the display substrate may further include a vertical internal branch electrode portion connecting end portions of the horizontal internal branch electrode portion.

In an exemplary embodiment, an end portion of the horizontal external branch electrode portion may be connected to an end portion of the vertical external branch electrode portion.

In an exemplary embodiment, an end portion of the horizontal external branch electrode portion may be connected to an end portion of the vertical internal branch electrode portion.

In an exemplary embodiment, the display substrate may further include an oblique internal branch electrode portion connected to the support electrode portion and extending in a third direction different from the first and second directions.

In an exemplary embodiment, the display substrate may further include a horizontal support electrode portion extending in the first direction and disposed in a boundary area of the first sub pixel electrode and the second sub pixel electrode.

In an exemplary embodiment, the oblique internal branch electrode portion may extend from the support electrode portion and may be inclined in a direction far from the horizontal support electrode portion.

In an exemplary embodiment, the oblique internal branch electrode portion may be inclined in a direction far from the horizontal internal branch electrode portion.

In an exemplary embodiment, the horizontal internal branch electrode portion may include a horizontal portion extending in the first direction, and an oblique portion extending from the horizontal portion in a third direction different from the first and second directions.

In an exemplary embodiment, the display substrate may further include an oblique internal branch electrode portion extending in a direction parallel to the oblique portion.

In an exemplary embodiment, the display substrate may further include a color filter layer disposed on the switching device.

In an exemplary embodiment, the display substrate may further include an organic layer disposed on the color filter layer and having a concave pattern.

In an exemplary embodiment, the concave pattern may be provided in an area corresponding to a central portion of the first sub pixel electrode and a central portion of the second sub pixel electrode.

In an exemplary embodiment, the concave pattern may be provided in an area corresponding to a central portion of a boundary area of the first sub pixel electrode and the second sub pixel electrode.

According to an exemplary embodiment of the invention, a method of manufacturing a display substrate includes forming a switching device including a gate electrode electrically connected to a gate line extending in a first direction, a source electrode electrically connected to a data line extending in a second direction perpendicular to the first direction, and a drain electrode spaced apart from the source electrode, on a base substrate, and forming a pixel electrode on the base substrate on which the switching device is disposed. The pixel electrode includes a first sub pixel electrode and a second sub pixel electrode. The first sub pixel electrode includes an internal electrode and an external electrode. The internal electrode includes a support electrode portion extending in the second direction, and a horizontal internal branch electrode portion extending in the first direction. The external electrode includes a horizontal external branch electrode portion disposed outside the internal electrode and extending in the first direction, and a vertical external branch electrode portion disposed outside the internal electrode and extending in the second direction. The second sub pixel electrode is adjacent to the first sub pixel electrode and has a shape symmetrical to the first sub pixel electrode.

In an exemplary embodiment, the pixel electrode may further include an oblique internal branch electrode portion connected to the support electrode portion and extending in a third direction different from the first and second directions.

In an exemplary embodiment, the method may further include forming a color filter layer on the switching device.

In an exemplary embodiment, the method may further include forming an organic layer on the color filter layer, and forming a concave pattern by patterning the organic layer.

In an exemplary embodiment, the concave pattern may be provided in an area corresponding to a central portion of the first sub pixel electrode and a central portion of the second sub pixel electrode.

In an exemplary embodiment, the concave pattern may be provided in an area corresponding to a central portion of a boundary area of the first sub pixel electrode and the second sub pixel electrode.

According to the invention, a pixel electrode of a display substrate includes a first sub pixel electrode and a second sub pixel electrode, and the pixel electrode has a division structure divided into four or eight areas. Thus, a gamma mixture effect may be generated, and thus a side visibility may be improved.

In addition, an organic layer disposed under a pixel electrode includes a concave pattern. Therefore, a thickness of a liquid crystal layer may be controlled differently by the concave pattern. Accordingly, a liquid crystal particle of the liquid crystal layer may be controlled, and thus a side visibility may be improved.

BRIEF DESCRIPTION OF THE DRAWINGS

The above and other features and advantages of the invention will become more apparent by describing in detailed exemplary embodiments thereof with reference to the accompanying drawings, in which.

DETAILED DESCRIPTION

Figure 1:
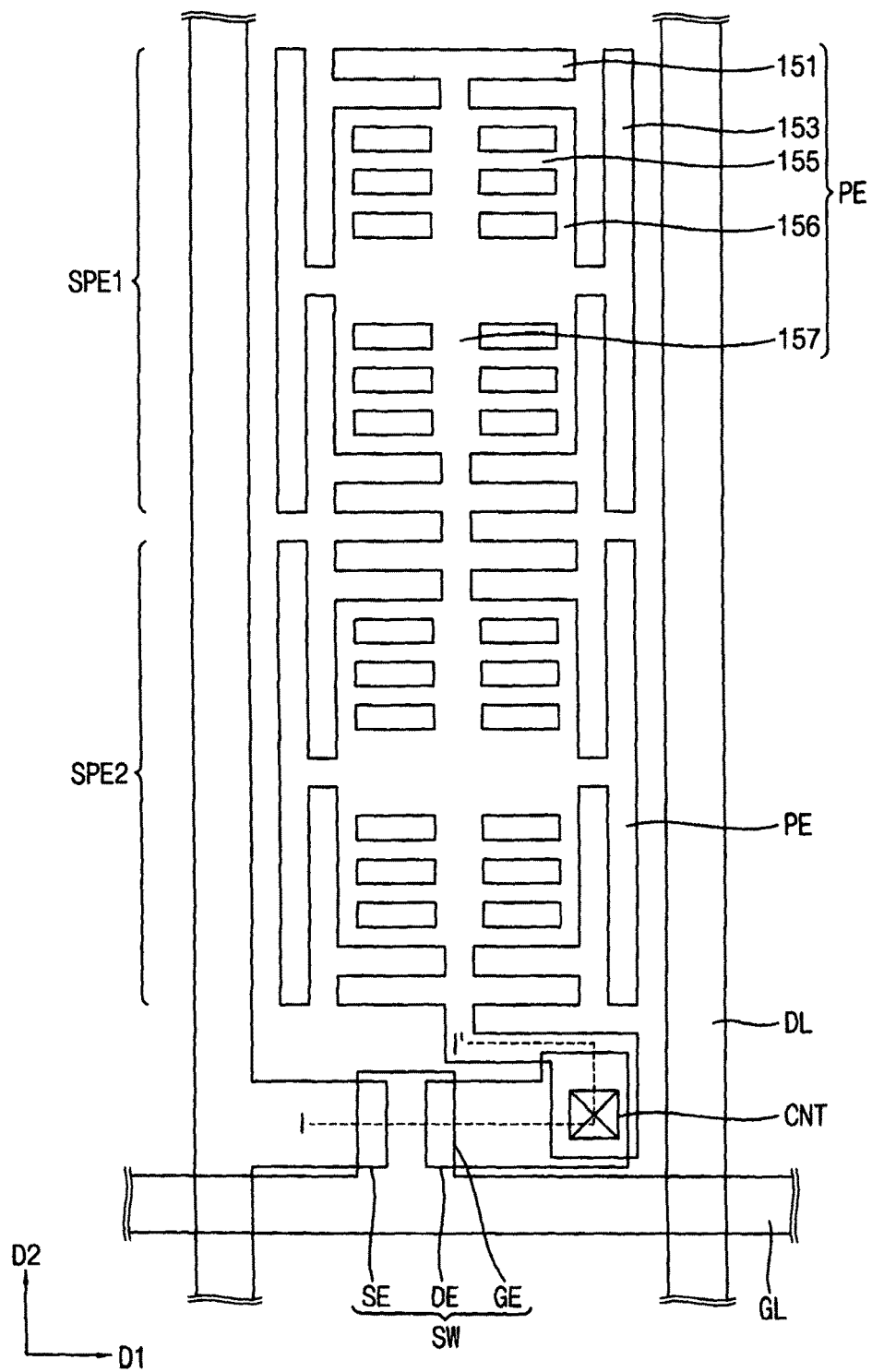
FIG. 1 is a plan view illustrating an exemplary embodiment of a display substrate according to the invention.

Hereinafter, the invention will be explained in detail with reference to the accompanying drawings. This invention may, however, be embodied in many different forms, and should not be construed as limited to the embodiments set forth herein. Rather, these embodiments are provided so that this invention will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Figure 2:
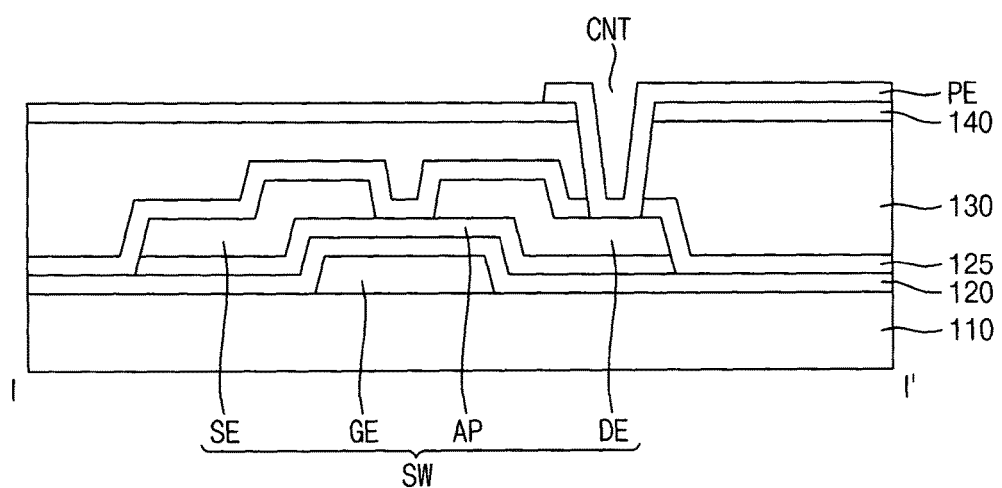
FIG. 2 is a cross-sectional view taken along line I-I' of FIG. 1.

FIG. 1 is a plan view illustrating a display substrate according to an exemplary embodiment of the invention. FIG. 2 is a cross-sectional view taken along line I-I' of FIG. 1.

Referring to FIGS. 1 and 2, the display substrate according to the illustrated exemplary embodiment includes a gate line GL, a data line DL crossing the gate line GL, a thin film transistor ("TFT") SW which is a switching device and a pixel electrode PE. The TFT SW is connected to the gate line GL and the data line DL. The pixel electrode PE is connected to the TFT SW through a contact hole CNT.

The gate line GL extends in a first direction D1. In an exemplary embodiment, the gate line GL may have a single layer structure including copper (Cu), silver (Ag), chrome (Cr), molybdenum (Mo), aluminum (Al), titanium (Ti), manganese (Mn) and a combination thereof, for example. In an alternative exemplary embodiment, the gate line GL may have a multi layer structure having a plurality of metal layers including materials different from each other. The gate line GL is electrically connected to a gate electrode GE of the TFT SW. A portion of the gate line GL may be the gate electrode GE.

A first insulation layer 120 is disposed on the gate line GL and the gate electrode GE. The first insulation layer 120 may include an inorganic material. In an exemplary embodiment, the first insulation layer 120 may include silicon oxide (SiOx) and/or silicon nitride (SiNx), for example. In an exemplary embodiment, the first insulation layer 120 may include silicon oxide (SiOx), and may have a thickness of about 500 angstroms (Å), for example. In an exemplary embodiment, the first insulation layer 120 may include a plurality of layers including materials different from each other.

An active pattern AP is provided on the first insulation layer 120. The active pattern AP may include an oxide semiconductor. In an exemplary embodiment, the oxide semiconductor may include zinc oxide (ZnO), zinc tin oxide ("ZTO"), zinc indium oxide ("ZIO"), indium oxide (InO), titanium oxide (TiO), indium gallium zinc oxide ("IGZO") or indium zinc tin oxide ("IZTO"), for example. The above-mentioned materials may be used as a single or may be mixed and used. Preferably, the oxide semiconductor may include indium gallium zinc oxide, for example.

A source metal pattern is provided on the active pattern AP. The source metal pattern may include the data line DL, a source electrode SE and the drain electrode DE. The data line DL is electrically connected to the source electrode SE. In an exemplary embodiment, the source electrode SE may be protruded from the data line DL in the first direction D1, for example. The data line DL may be disposed on a layer on which the source electrode SE and the drain electrode DE are disposed.

A second insulation layer 125 is disposed on the source electrode SE and the drain electrode DE. The second insulation layer 125 may include an inorganic material. In an exemplary embodiment, the second insulation layer 125 may include silicon oxide (SiOx) and/or silicon nitride (SiNx), for example. In an exemplary embodiment, the second insulation layer 125 may include silicon oxide (SiOx), and may have a thickness of about 500 Å, for example. In an exemplary embodiment, the second insulation layer 125 may have a multi layer structure including materials different from each other.

A color filter layer 130 is disposed on the second insulation layer 125. The color filter layer 130 may include a first sub color filter layer, a second sub color filter layer and a third sub color filter layer.

In an exemplary embodiment, the first sub color filter layer may include a red material, for example. In an exemplary embodiment, the second sub color filter layer may include a green material, for example. In an exemplary embodiment, the third sub color filter layer may include a blue material, for example. However, the invention is not limited thereto, and the first to third sub color filter layers may include various other color materials. The second sub color filter layer may be adjacent to the first sub color filter layer. The third sub color filter layer may be adjacent to the second sub color filter layer. The first sub color filter layer, the second sub color filter layer and the third sub color filter layer may be sequentially provided to form the color filter layer 130.

A third insulation layer 140 is disposed on the color filter layer 130. The third insulation layer 140 may include an inorganic material. In an exemplary embodiment, the third insulation layer 140 may include silicon oxide (SiOx) and/or silicon nitride (SiNx), for example. In an exemplary embodiment, the third insulation layer 140 may include silicon oxide (SiOx), and may have a thickness of about 500 Å, for example. In an exemplary embodiment, the third insulation layer 140 may have a multi layer structure including materials different from each other.

A pixel electrode PE is disposed on the third insulation layer 140. The pixel electrode PE may include a transparent conductive material. In an exemplary embodiment, the pixel electrode PE may include ITO or IZO, for example.

The pixel electrode PE may include a first sub pixel electrode SPE1 and a second sub pixel electrode SPE2.

The second sub pixel electrode SPE2 may be adjacent to the first sub pixel electrode SPE1 in a second direction D2. The second sub pixel SPE2 may be symmetrical to the first sub pixel electrode SPE1 in the second direction D2.

The first sub pixel electrode SPE1 may include an internal electrode and an external electrode.

The internal electrode may include a support electrode portion 157 extending in the second direction D2, a horizontal internal branch electrode portion 155 connected to the support electrode portion 157 and extending in the first direction D1 crossing the second direction D2, and a vertical internal branch electrode portion 156 connecting end portions (e.g., left and right end portions) of the horizontal internal branch electrode portions 155.

The internal electrode of the first sub pixel electrode SPE1 has a structure in which the horizontal internal branch electrode portions 155 are connected by the support electrode portion 157 and the vertical internal branch electrode portion 156. Thus, the internal electrode of the first sub pixel electrode SPE1 may have a shape having four equal structures (i.e., upper left, upper right, lower left and lower right structures), for example.

The external electrode is disposed outside the internal electrode, and may include a vertical external branch electrode portion 153 extending in the second direction D2 and a horizontal external branch electrode portion 151 disposed outside the internal electrode and extending in the first direction D1. The vertical external branch electrode portion 153 is disposed at left and right sides of the internal electrode, and is electrically connected to the internal electrode. The horizontal external branch electrode portion 151 is disposed in upper and lower sides of the internal electrode, and is electrically connected to the internal electrode.

The second sub pixel electrode SPE2 is adjacent to the first sub pixel electrode SPE1 in the second direction D2. The second sub pixel electrode SPE2 may be symmetrical to the first sub pixel electrode SPE1 in the second direction D2. Thus, the second sub pixel electrode SPE2 has substantially the same shape as that of the first sub pixel electrode SPE1.

The second sub pixel electrode SPE2 may include an internal electrode and an external electrode. The shape of the second sub pixel electrode SPE2 is substantially the same as the shape of the first sub pixel electrode SPE1, and thus any further repetitive explanation concerning the second sub pixel electrode SPE2 will be omitted.

In the illustrated exemplary embodiment, an end portion of the horizontal external branch electrode portion 151 is not connected to an end portion of the vertical external branch electrode portion 153. In addition, the vertical external branch electrode portion 153 of the first sub pixel electrode SPE1 is not connected to a vertical external branch electrode portion of the second sub pixel electrode SPE2. Thus, in the illustrated exemplary embodiment, four corners of the pixel electrode PE and an area where the first sub pixel electrode SPE1 and the second sub pixel electrode SPE2 are adjacent may be opened.

The internal electrode of the second sub pixel electrode SPE2 may have a shape including four equal structures (i.e., upper left, upper right, lower left and lower right structures).

Thus, since the first sub pixel electrode SPE1 and the second sub pixel electrode SPE2 are symmetrical to each other, the first sub pixel electrode SPE1 and the second sub pixel electrode SPE2 may have a shape including eight equal structures. Therefore, the pixel electrode PE may have a division structure divided as eight portions, generates a gamma mixture effect, and thus may improve a side visibility.

FIGS. 3 to 7 are cross-sectional views illustrating a method of manufacturing the display substrate of FIG. 2.

Figure 3:
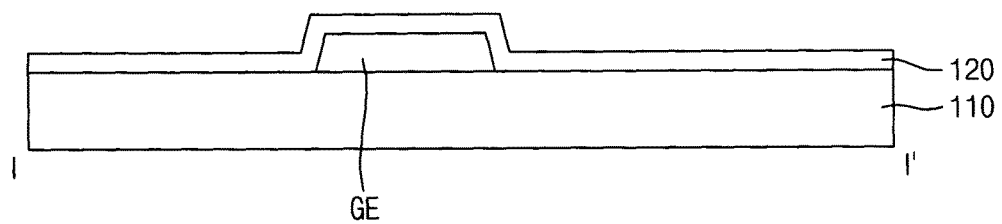
FIGS. 3 to 7 are cross-sectional views illustrating a method of manufacturing the display substrate of FIG. 2.

Referring to FIG. 3, the gate electrode GE and the first insulation layer 120 are disposed on a base substrate 110.

In an exemplary embodiment, a gate metal layer is disposed on the base substrate 110, and the gate metal layer is patterned, to form the gate line GL and the gate electrode GE, for example. A glass substrate, a quartz substrate, a silicon substrate, a plastic substrate, and the like may be used as the base substrate 110.

In an exemplary embodiment, the gate metal layer may include copper (Cu), silver (Ag), chrome (Cr), molybdenum (Mo), aluminum (Al), titanium (Ti), manganese (Mn), aluminum (Al), and/or an alloy thereof, for example. The gate metal layer may have a single layer structure or a multi layer structure having a plurality of metal layers including materials different from each other. In an exemplary embodiment, the gate metal layer may include a copper layer and a titanium layer disposed on an upper portion and/or a lower portion of the copper layer.

Next, the first insulation layer 120 covers the gate line GL and the gate electrode GE. In an exemplary embodiment, the first insulation layer 120 may include silicon nitride, silicon oxide, and the like, for example. The first insulation layer 120 may have a single layer structure or a multi layer structure. In an exemplary embodiment, the first insulation layer 120 may include a lower insulation layer having silicon nitride and an upper insulation layer having silicon oxide.

Figure 4:
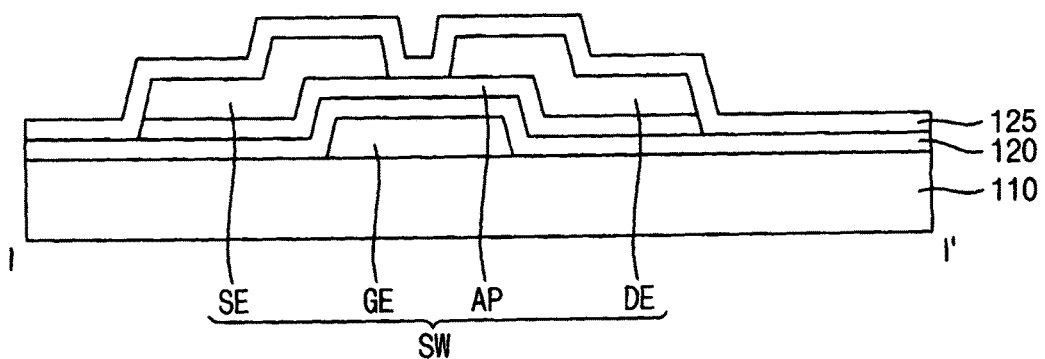

Referring to FIG. 4, the active pattern AP, the source electrode SE, the drain electrode DE and the second insulation layer 125 are disposed on the base substrate 110 on which the first insulation layer 120 is disposed.

The active pattern AP is provided on the first insulation layer 120. The active pattern AP may include an oxide semiconductor. In an exemplary embodiment, the oxide semiconductor may include zinc oxide (ZnO), ZTO, ZIO, indium oxide (InO), titanium oxide (TiO), IGZO or IZTO, for example. The above-mentioned materials may be used as a single or may be mixed and used. Preferably, the oxide semiconductor may include indium gallium zinc oxide, for example.

The source metal pattern is provided on the active pattern AP. The source metal pattern may include the data line DL, the source electrode SE and the drain electrode DE. The data line DL is electrically connected to the source electrode SE. In an exemplary embodiment, the source electrode SE may be protruded from the data line DL in the first direction D1, for example. The data line DL may be disposed on the layer on which the source electrode SE and the drain electrode DE are disposed.

The second insulation layer 125 is disposed on the source electrode SE and the drain electrode DE. The second insulation layer 125 may include an inorganic material. In an exemplary embodiment, the second insulation layer 125 may include silicon oxide (SiOx) or silicon nitride (SiNx), for example. In an exemplary embodiment, the second insulation layer 125 may include silicon oxide (SiOx), and may have a thickness of about 500 Å, for example. In an exemplary embodiment, the second insulation layer 125 may have a multi layer structure including materials different from each other.

Figure 5:
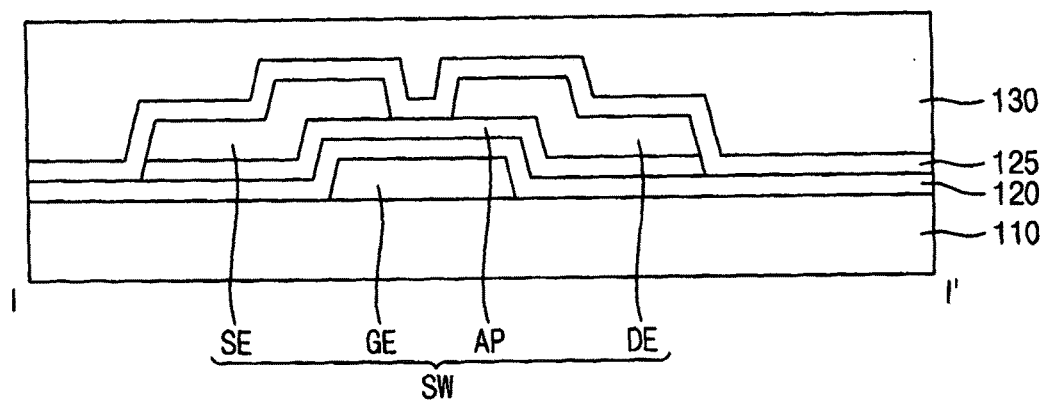

Referring to FIG. 5, the color filter layer 130 is disposed on the base substrate 110 on which the second insulation layer 125 is disposed.

The color filter layer 130 is disposed on the second insulation layer 125. The color filter layer 130 may include the first sub color filter layer, the second sub color filter layer and the third sub color filter layer.

In an exemplary embodiment, the first sub color filter layer may include a red material, for example. In an exemplary embodiment, the second sub color filter layer may include a green material, for example. In an exemplary embodiment, the third sub color filter layer may include a blue material, for example. However, the invention is not limited thereto, and the first to third sub color filter layers may include various other color materials. The second sub color filter layer may be adjacent to the first sub color filter layer. The third sub color filter layer may be adjacent to the second sub color filter layer. The first sub color filter layer, the second sub color filter layer and the third sub color filter layer may be sequentially provided to form the color filter layer 130.

Figure 6:
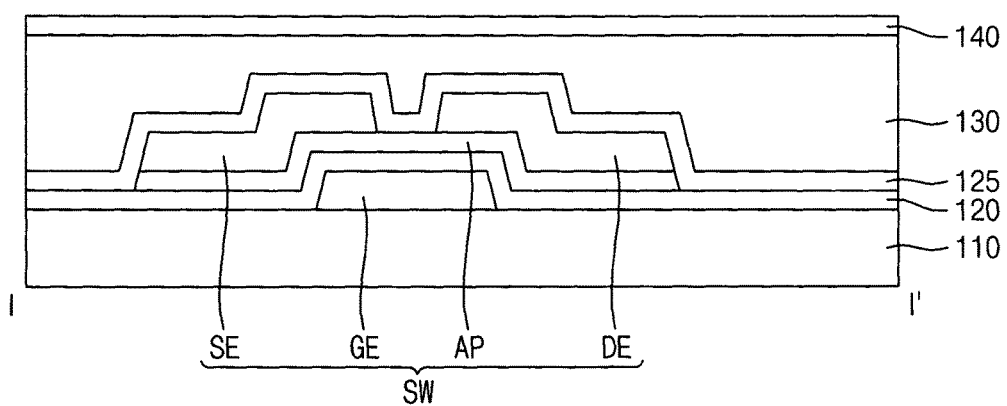

Referring to FIG. 6, the third insulation layer 140 is disposed on the base substrate 110 on which the color filter layer 130 is disposed.

The third insulation layer 140 is disposed on the color filter layer 130. The third insulation layer 140 may include an inorganic material. In an exemplary embodiment, the third insulation layer 140 may include silicon oxide (SiOx) and/or silicon nitride (SiNx), for example. In an exemplary embodiment, the third insulation layer 140 may include silicon oxide (SiOx), and may have a thickness of about 500 Å, for example. In an exemplary embodiment, the third insulation layer 140 may have a multi layer structure including materials different from each other.

Figure 7:
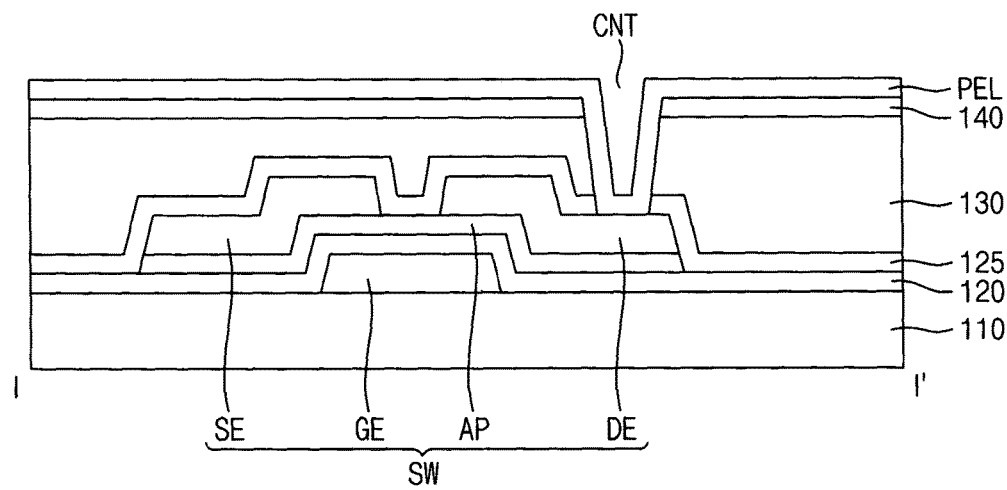

Referring to FIG. 7, a transparent electrode layer PEL is disposed on the base substrate 110 on which the third insulation layer 140 is disposed.

The transparent electrode layer PEL is disposed on the base substrate 110 on which the third insulation layer 140 is disposed. The transparent electrode layer PEL may include a transparent conductive material. In an exemplary embodiment, the transparent electrode layer PEL may include ITO or IZO, for example.

Referring to FIGS. 2 and 7, the pixel electrode PE is provided by patterning the transparent conductive layer PEL.

The pixel electrode PE may include a transparent conductive material. In an exemplary embodiment, the pixel electrode PE may include ITO or IZO, for example.

The pixel electrode PE is electrically connected to the drain electrode DE partially exposed through the contact hole CNT defined through the color filter layer 130 and the second insulation layer 125.

Figure 8:
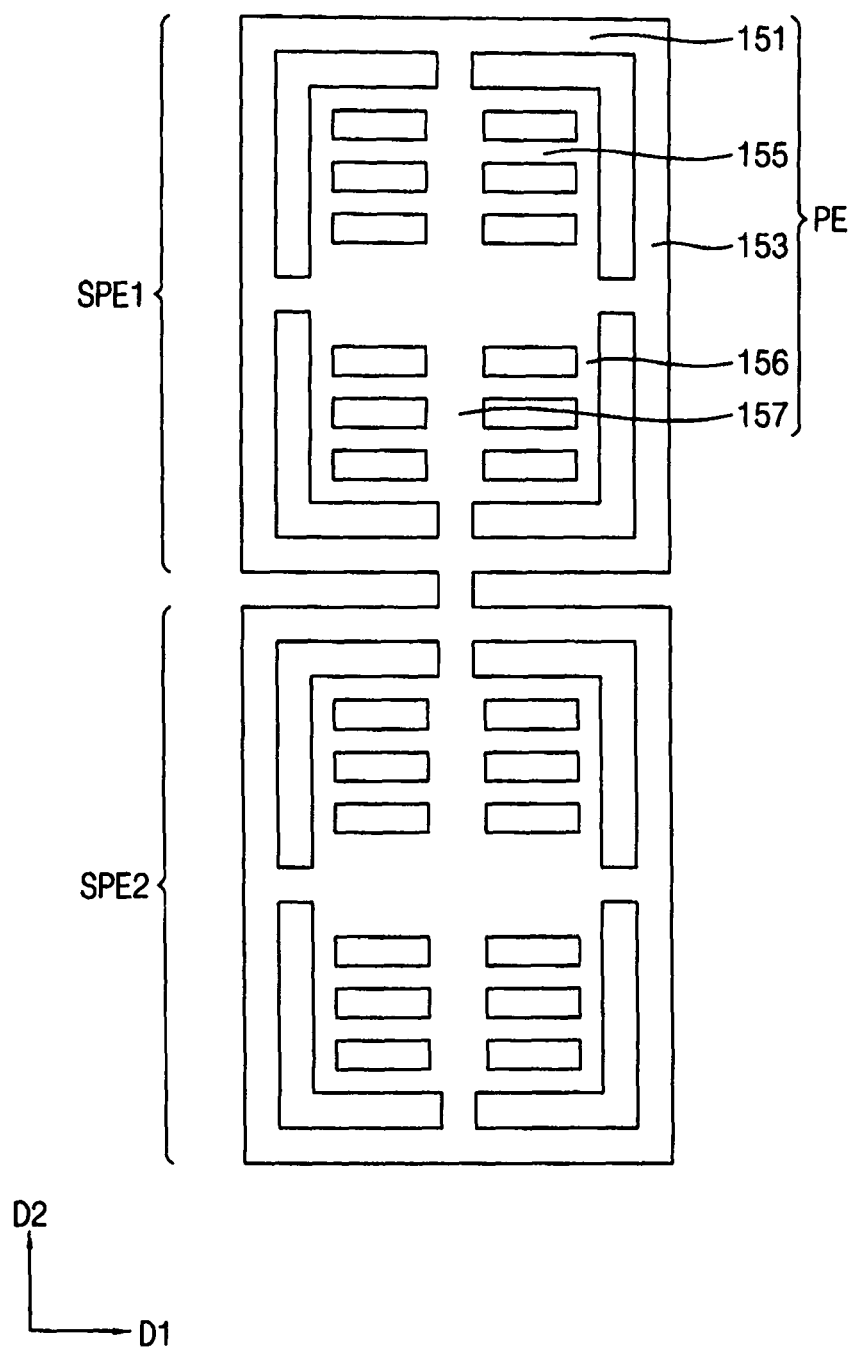
FIG. 8 is a plan view illustrating an exemplary embodiment of a pixel electrode of a display substrate according to the invention.

FIG. 8 is a plan view illustrating a pixel electrode of a display substrate according to an exemplary embodiment of the invention.

The pixel electrode PE according to the exemplary embodiment is substantially the same as the pixel electrode PE according to the aforementioned exemplary embodiment illustrated in FIG. 1 except for the horizontal external branch electrode portion 151 and the vertical external branch electrode portion 153. Thus, the same reference numerals will be used to refer to same or like parts as those described in the aforementioned exemplary embodiment and any further repetitive explanation concerning the above elements will be omitted.

Referring to FIG. 8, the end portion of the horizontal external branch electrode portion 151 is connected to the end portion of the vertical external branch electrode portion 153. However, the vertical external branch electrode portion 153 of the first sub pixel electrode SPE1 is not connected to a vertical external branch electrode portion of the second sub pixel electrode SPE2. Thus, four corners of the pixel electrode PE according to the illustrated exemplary embodiment are not opened, and an area where the first sub pixel electrode SPE1 and the second sub pixel electrode SPE2 are adjacent may be opened.

The internal electrode of the second sub pixel electrode SPE2 may have a shape including four equal structures (i.e., upper left, upper right, lower left and lower right structures). Thus, since the first sub pixel electrode SPE1 and the second sub pixel electrode SPE2 are symmetrical to each other, the first sub pixel electrode SPE1 and the second sub pixel electrode SPE2 may have a shape including eight equal structures. Therefore, the pixel electrode PE may have a division structure divided as eight portions, generates a gamma mixture effect, and thus may improve a side visibility.

Figure 9:
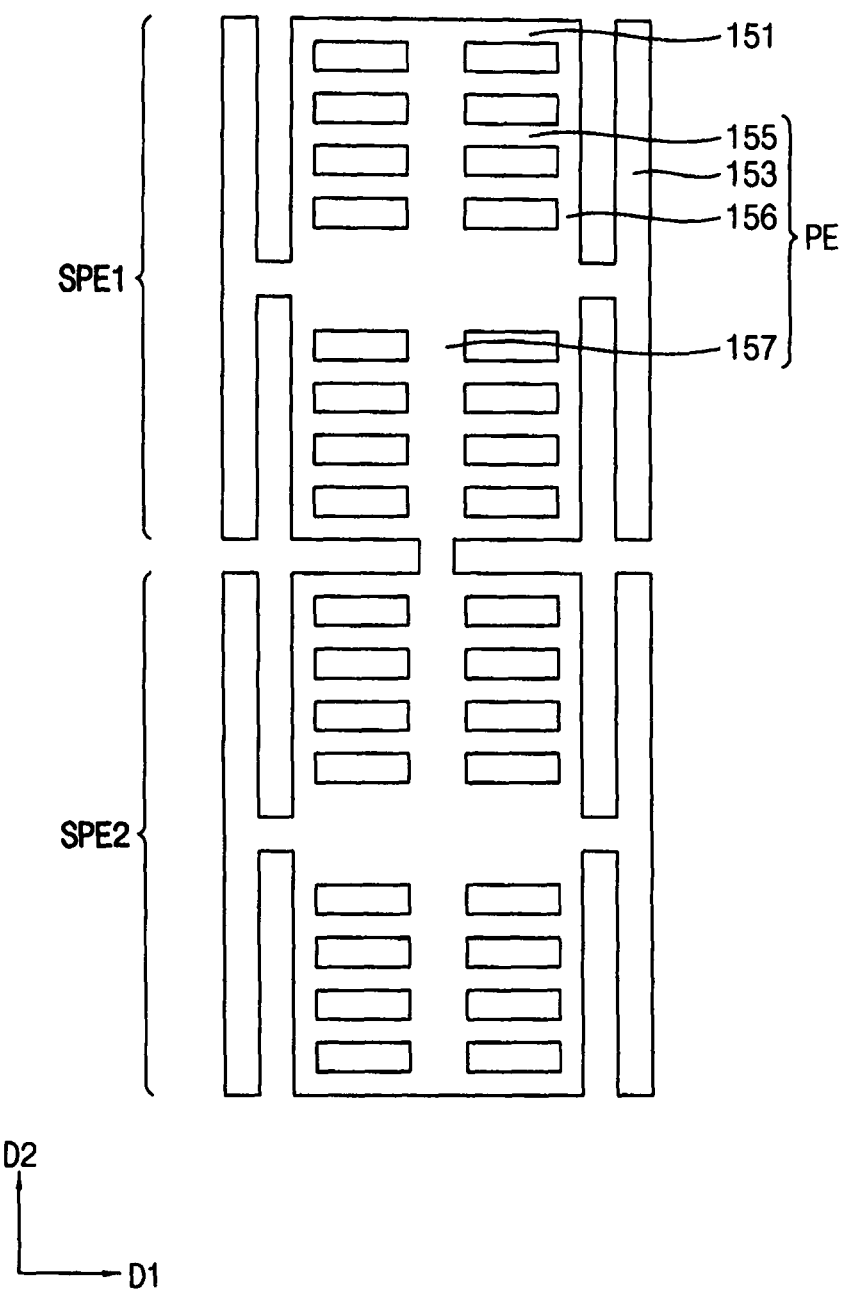
FIG. 9 is a plan view illustrating an exemplary embodiment of a pixel electrode of a display substrate according to the invention.

FIG. 9 is a plan view illustrating a pixel electrode of a display substrate according to an exemplary embodiment of the invention.

The pixel electrode PE according to the illustrated exemplary embodiment is substantially the same as the pixel electrode PE according to the aforementioned exemplary embodiment illustrated in FIG. 1 except for the horizontal external branch electrode portion 151 and the vertical external branch electrode portion 153. Thus, the same reference numerals will be used to refer to same or like parts as those described in the aforementioned exemplary embodiment and any further repetitive explanation concerning the above elements will be omitted.

Referring to FIG. 9, the end portion of the horizontal external branch electrode portion 151 is connected to the vertical internal branch electrode portion 156. Thus, the horizontal external branch electrode portion 151 of the illustrated exemplary embodiment may have a shape the same as that of the horizontal internal branch electrode portion 155.

The end portion of the horizontal external branch electrode portion 151 is not connected to the end portion of the vertical external branch electrode portion 153. In addition, the vertical external branch electrode portion 153 of the first sub pixel electrode SPE1 is not connected to a vertical external branch electrode portion of the second sub pixel electrode SPE2. Thus, four corners of the pixel electrode PE and an area where the first sub pixel electrode SPE1 and the second sub pixel electrode SPE2 are adjacent according to the illustrated exemplary embodiment may be opened.

The internal electrode of the second sub pixel electrode SPE2 may have a shape including four equal structures (i.e., upper left, upper right, lower left and lower right structures). Thus, since the first sub pixel electrode SPE1 and the second sub pixel electrode SPE2 are symmetrical to each other, the first sub pixel electrode SPE1 and the second sub pixel electrode SPE2 may have a shape including eight equal structures. Therefore, the pixel electrode PE may have a division structure divided as eight portions, generates a gamma mixture effect, and thus may improve a side visibility.

Figure 10:
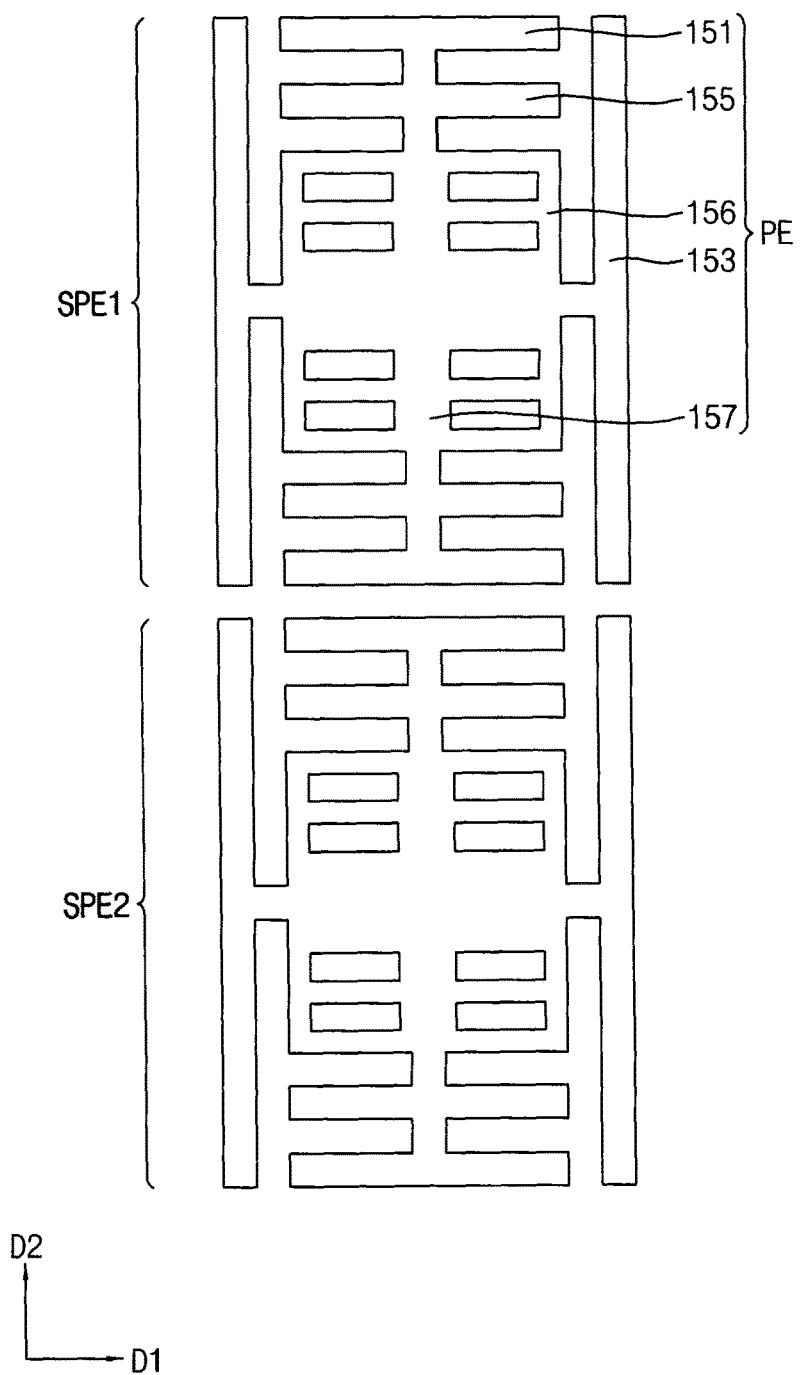
FIG. 10 is a plan view illustrating an exemplary embodiment of a pixel electrode of a display substrate according to the invention.

FIG. 10 is a plan view illustrating a pixel electrode of a display substrate according to an exemplary embodiment of the invention.

The pixel electrode PE according to the illustrated exemplary embodiment is substantially the same as the pixel electrode PE according to the aforementioned exemplary embodiment illustrated in FIG. 1 except for the horizontal internal branch electrode portion 155 and the vertical internal branch electrode portion 156. Thus, the same reference numerals will be used to refer to same or like parts as those described in the aforementioned exemplary embodiment and any further repetitive explanation concerning the above elements will be omitted.

Referring to FIG. 10, one end portion of the horizontal internal branch electrode portions 155 is not connected to the vertical internal branch electrode portion 156. Thus, one of the horizontal internal branch electrode portions 155 may have a shape the same as that of the horizontal external branch electrode portion 151.

The end portion of the horizontal external branch electrode portion 151 is not connected to the end portion of the vertical external branch electrode portion 153. In addition, the vertical external branch electrode portion 153 of the first sub pixel electrode SPE1 is not connected to a vertical external branch electrode portion of the second sub pixel electrode SPE2. Thus, four corners of the pixel electrode PE and an area where the first sub pixel electrode SPE1 and the second sub pixel electrode SPE2 are adjacent according to the illustrated exemplary embodiment may be opened.

The internal electrode of the second sub pixel electrode SPE2 may have a shape including four equal structures (i.e., upper left, upper right, lower left and lower right structures). Thus, since the first sub pixel electrode SPE1 and the second sub pixel electrode SPE2 are symmetrical to each other, the first sub pixel electrode SPE1 and the second sub pixel electrode SPE2 may have a shape including eight equal structures. Therefore, the pixel electrode PE may have a division structure divided as eight portions, generates a gamma mixture effect, and thus may improve a side visibility.

Figure 11:
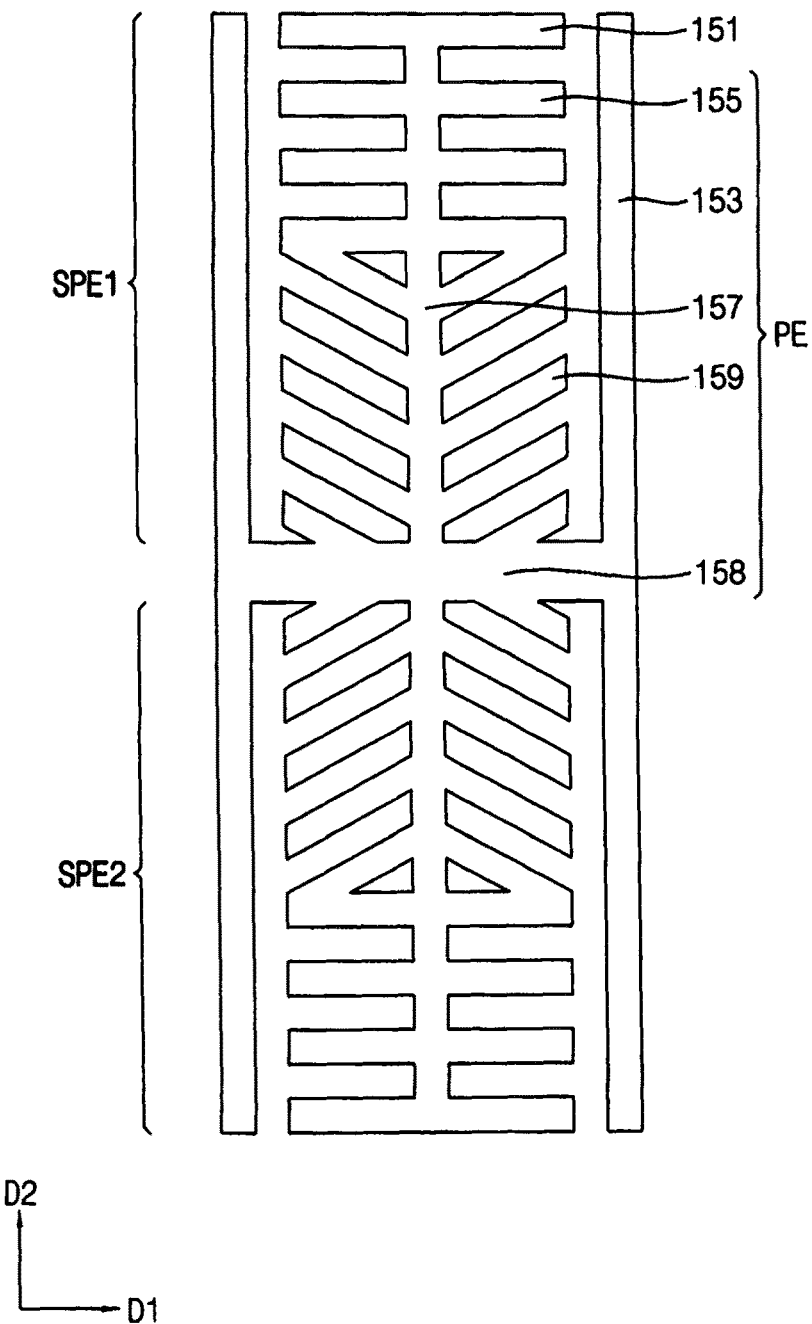
FIG. 11 is a plan view illustrating an exemplary embodiment of a pixel electrode of a display substrate according to the invention.

FIG. 11 is a plan view illustrating a pixel electrode of a display substrate according to an exemplary embodiment of the invention.

Referring to FIG. 11, the pixel electrode PE according to the illustrated exemplary embodiment may include a first sub pixel electrode SPE1 and a second sub pixel electrode SPE2.

The second sub pixel electrode SPE2 may be adjacent to the first sub pixel electrode SPE1 in a second direction D2. The second sub pixel SPE2 may be symmetrical to the first sub pixel electrode SPE1 in the second direction D2.

The first sub pixel electrode SPE1 may include an internal electrode and an external electrode.

The internal electrode may include a support electrode portion 157 extending in the second direction D2, a horizontal internal branch electrode portion 155 connected to the support electrode portion 157 and extending in a first direction D1 crossing the second direction D2, and an oblique internal branch electrode portion 159 connected to the support electrode portion 157 and extending in a third direction (e.g., a diagonal direction) different from the first and second directions D1 and D2.

The external electrode may include a vertical external branch electrode portion 153 disposed outside the internal electrode and extending in the second direction D2, and a horizontal external branch electrode portion 151 disposed outside the internal electrode and extending in the first direction D1. The vertical external branch electrode portion 153 is disposed left and right sides of the internal electrode, and is electrically connected to the internal electrode. The horizontal external branch electrode portion 151 is disposed in upper and lower sides of the internal electrode, and is electrically connected to the internal electrode.

The second sub pixel electrode SPE2 is adjacent to the first sub pixel electrode SPE1 in the second direction D2. The second sub pixel electrode SPE2 may be symmetrical to the first sub pixel electrode SPE1 in the second direction D2. Thus, the second sub pixel electrode SPE2 has substantially the same shape as that of the first sub pixel electrode SPE1.

The second sub pixel electrode SPE2 may include an internal electrode and an external electrode. The shape of the second sub pixel electrode SPE2 is substantially the same as the shape of the first sub pixel electrode SPE1, and thus any further repetitive explanation concerning the second sub pixel electrode SPE2 will be omitted.

In the illustrated exemplary embodiment, the pixel electrode PE may further include a horizontal supporting electrode portion 158 disposed in a boundary area between the first sub pixel electrode SPE1 and the second sub pixel electrode SPE2.

The end portions (e.g., left and right end portions) of the horizontal internal branch electrode portions 155 are not connected to each other. Thus, the horizontal internal branch electrode portion 155 may have a shape the same as that of the horizontal external branch electrode portion 151. The oblique internal branch electrode portion 159 extends from the support electrode portion 157, and may be inclined in a direction far from the horizontal supporting electrode portion 158.

Each of the internal electrodes of the first sub pixel electrode SPE1 and the second sub pixel electrode SPE2 includes the horizontal internal branch electrode portion 155 and the oblique internal branch electrode portion 159. The internal electrode is divided as two portions (e.g., left portion and right portion) by the support electrode portion 157, and thus the internal electrode of the first sub pixel electrode SPE1 includes two portions of the horizontal internal branch electrode portion 155 and two portions of the oblique internal branch electrode portion 159. Thus, the internal electrode of the first sub pixel electrode SPE1 is divided as four portions. In addition, since the second sub pixel electrode SPE2 has a shape the same as that of the first sub pixel electrode SPE1, the first sub pixel electrode SPE1 and the second sub pixel electrode SPE2 may have a shape including eight structures. Therefore, the pixel electrode PE may have a division structure divided as eight portions, generates a gamma mixture effect, and thus may improve a side visibility.

Figure 12:
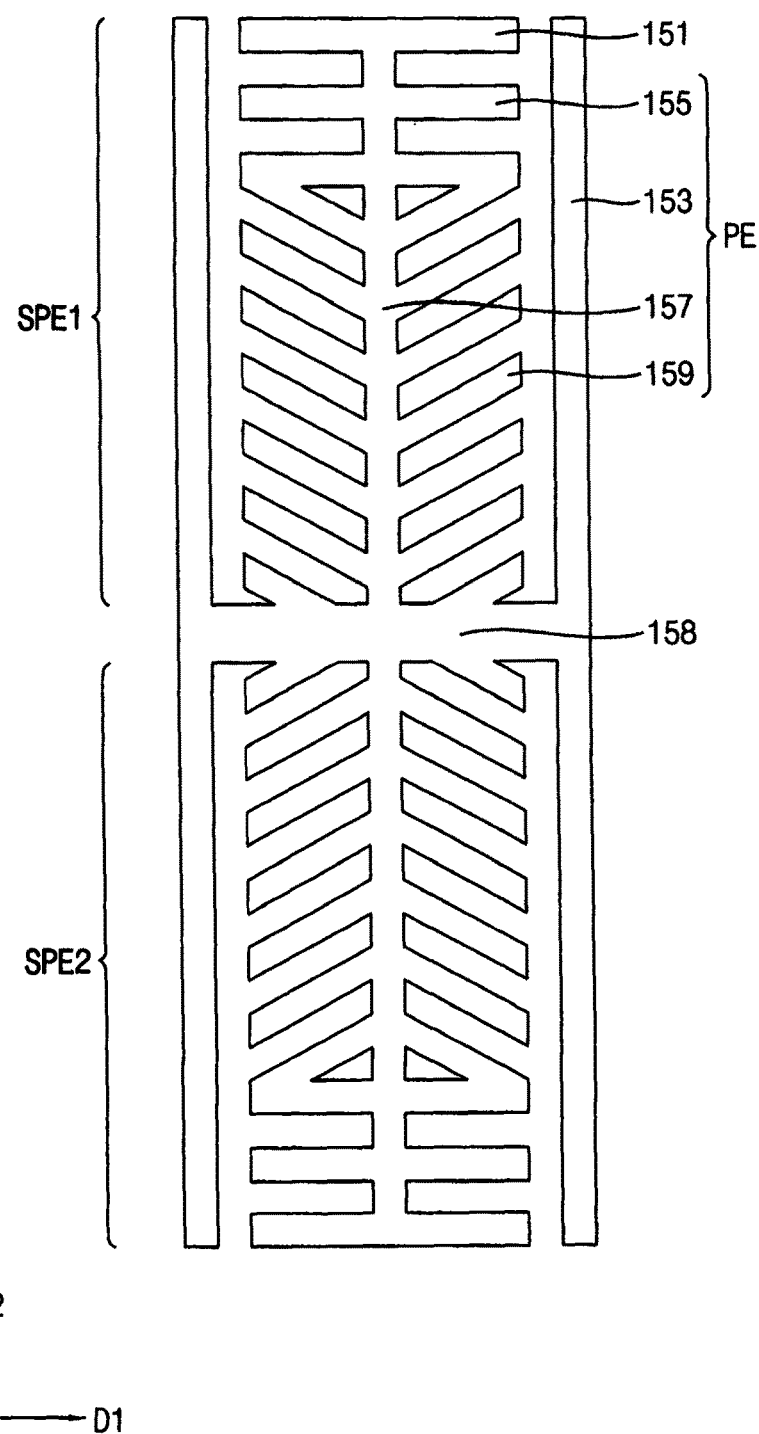
FIG. 12 is a plan view illustrating an exemplary embodiment of a pixel electrode of a display substrate according to the invention.

FIG. 12 is a plan view illustrating a pixel electrode of a display substrate according to an exemplary embodiment of the invention.

The pixel electrode PE according to the illustrated exemplary embodiment is substantially the same as the pixel electrode PE according to the aforementioned exemplary embodiment illustrated in FIG. 11 except for the horizontal internal branch electrode portion 155. Thus, the same reference numerals will be used to refer to same or like parts as those described in the aforementioned exemplary embodiment and any further repetitive explanation concerning the above elements will be omitted.

Referring to FIG. 12, the first sub pixel electrode SPE1 according to the illustrated exemplary embodiment includes two horizontal internal branch electrode portions 155.

Each of the internal electrodes of the first sub pixel electrode SPE1 and the second sub pixel electrode SPE2 includes the horizontal internal branch electrode portion 155 and the oblique internal branch electrode portion 159. The internal electrode is divided as two portions (e.g., left portion and right portion) by the support electrode portion 157, and thus the internal electrode of the first sub pixel electrode SPE1 includes two portions of the horizontal internal branch electrode portion 155 and two portions of the oblique internal branch electrode portion 159. Thus, the internal electrode of the first sub pixel electrode SPE1 is divided as four portions. In addition, since the second sub pixel electrode SPE2 has a shape the same as that of the first sub pixel electrode SPE1, the first sub pixel electrode SPE1 and the second sub pixel electrode SPE2 may have a shape including eight structures. Therefore, the pixel electrode PE may have a division structure divided as eight portions, generates a gamma mixture effect, and thus may improve a side visibility.

Figure 13:
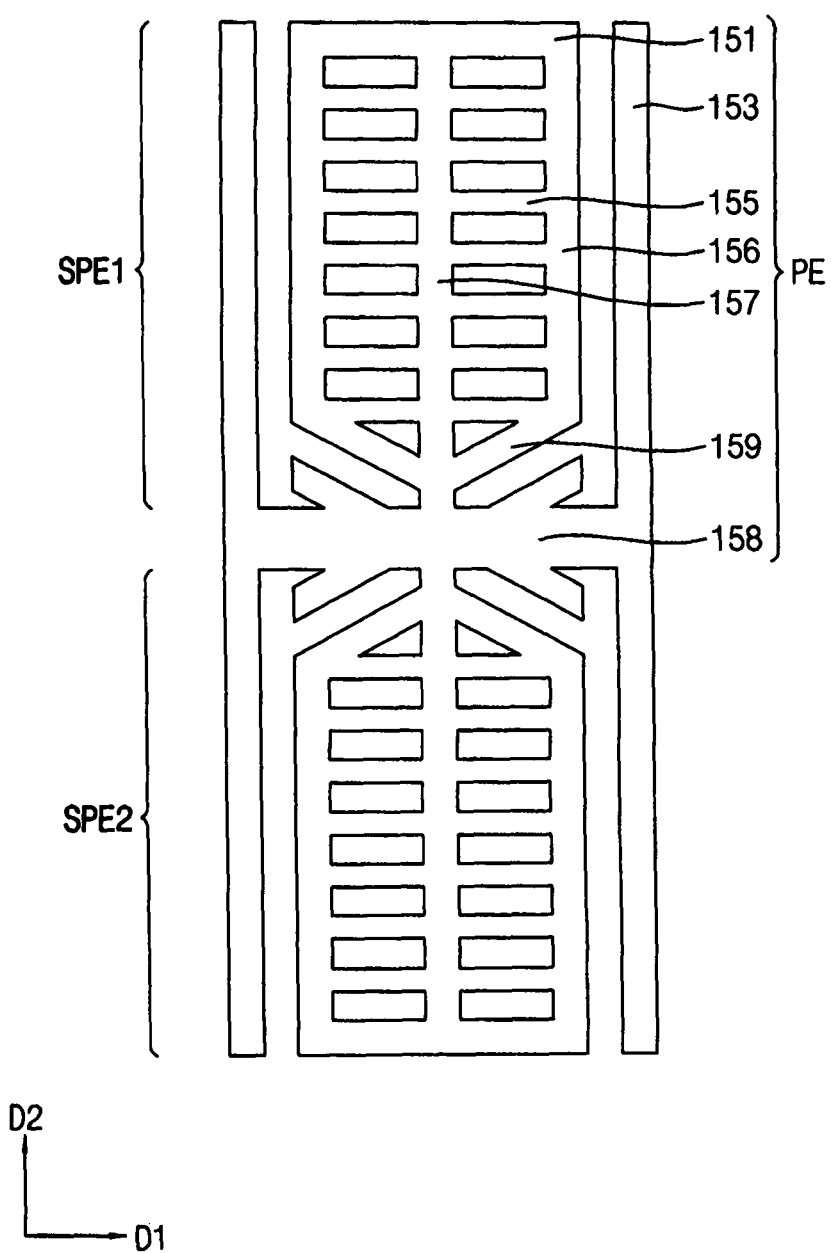
FIG. 13 is a plan view illustrating an exemplary embodiment of a pixel electrode of a display substrate according to the invention.

FIG. 13 is a plan view illustrating a pixel electrode of a display substrate according to an exemplary embodiment of the invention.

The pixel electrode PE according to the illustrated exemplary embodiment is substantially the same as the pixel electrode PE according to the aforementioned exemplary embodiment illustrated in FIG. 11 except for the horizontal internal branch electrode portion 155, the vertical internal branch electrode portion 156 and the oblique internal branch electrode portion 159. Thus, the same reference numerals will be used to refer to same or like parts as those described in the aforementioned exemplary embodiment and any further repetitive explanation concerning the above elements will be omitted.

Referring to FIG. 13, the first sub pixel electrode SPE1 according to the illustrated exemplary embodiment includes two oblique internal branch electrode portions 159. The end portions (e.g., left and right end portions) of the horizontal internal branch electrode portions 155 are connected to the vertical internal branch electrode portion 156.

Each of the internal electrodes of the first sub pixel electrode SPE1 and the second sub pixel electrode SPE2 includes the horizontal internal branch electrode portion 155 and the oblique internal branch electrode portion 159. The internal electrode is divided as two portions (e.g., left portion and right portion) by the support electrode portion 157, and thus the internal electrode of the first sub pixel electrode SPE1 includes two portions of the horizontal internal branch electrode portion 155 and two portions of the oblique internal branch electrode portion 159. Thus, the internal electrode of the first sub pixel electrode SPE1 is divided as four portions. In addition, since the second sub pixel electrode SPE2 has a shape the same as that of the first sub pixel electrode SPE1, the first sub pixel electrode SPE1 and the second sub pixel electrode SPE2 may have a shape including eight structures. Therefore, the pixel electrode PE may have a division structure divided as eight portions, generates a gamma mixture effect, and thus may improve a side visibility.

Figure 14:
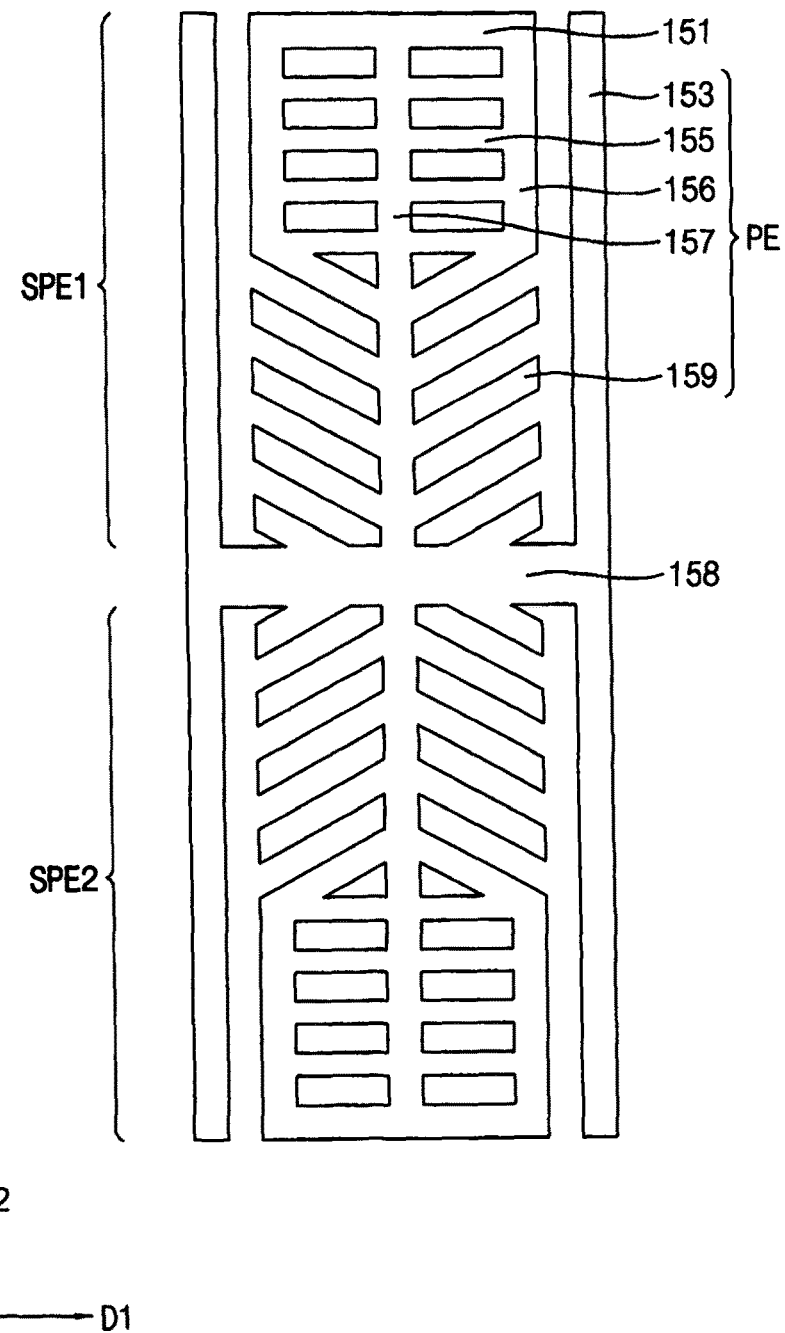
FIG. 14 is a plan view illustrating an exemplary embodiment of a pixel electrode of a display substrate according to the invention.

FIG. 14 is a plan view illustrating a pixel electrode of a display substrate according to an exemplary embodiment of the invention.

The pixel electrode PE according to the illustrated exemplary embodiment is substantially the same as the pixel electrode PE according to the aforementioned exemplary embodiment illustrated in FIG. 11 except for the horizontal internal branch electrode portion 155, the vertical internal branch electrode portion 156 and the oblique internal branch electrode portion 159. Thus, the same reference numerals will be used to refer to same or like parts as those described in the aforementioned exemplary embodiment and any further repetitive explanation concerning the above elements will be omitted.

Referring to FIG. 14, the first sub pixel electrode SPE1 according to the illustrated exemplary embodiment includes four horizontal internal branch electrode portions 155. The end portions (e.g., left and right end portions) of the horizontal internal branch electrode portions 155 are connected to the vertical internal branch electrode portion 156.

Each of the internal electrodes of the first sub pixel electrode SPE1 and the second sub pixel electrode SPE2 includes the horizontal internal branch electrode portion 155 and the oblique internal branch electrode portion 159. The internal electrode is divided as two portions (e.g., left portion and right portion) by the support electrode portion 157, and thus the internal electrode of the first sub pixel electrode SPE1 includes two portions of the horizontal internal branch electrode portion 155 and two portions of the oblique internal branch electrode portion 159. Thus, the internal electrode of the first sub pixel electrode SPE1 is divided as four portions. In addition, since the second sub pixel electrode SPE2 has a shape the same as that of the first sub pixel electrode SPE1, the first sub pixel electrode SPE1 and the second sub pixel electrode SPE2 may have a shape including eight structures. Therefore, the pixel electrode PE may have a division structure divided as eight portions, generates a gamma mixture effect, and thus may improve a side visibility.

Figure 15:
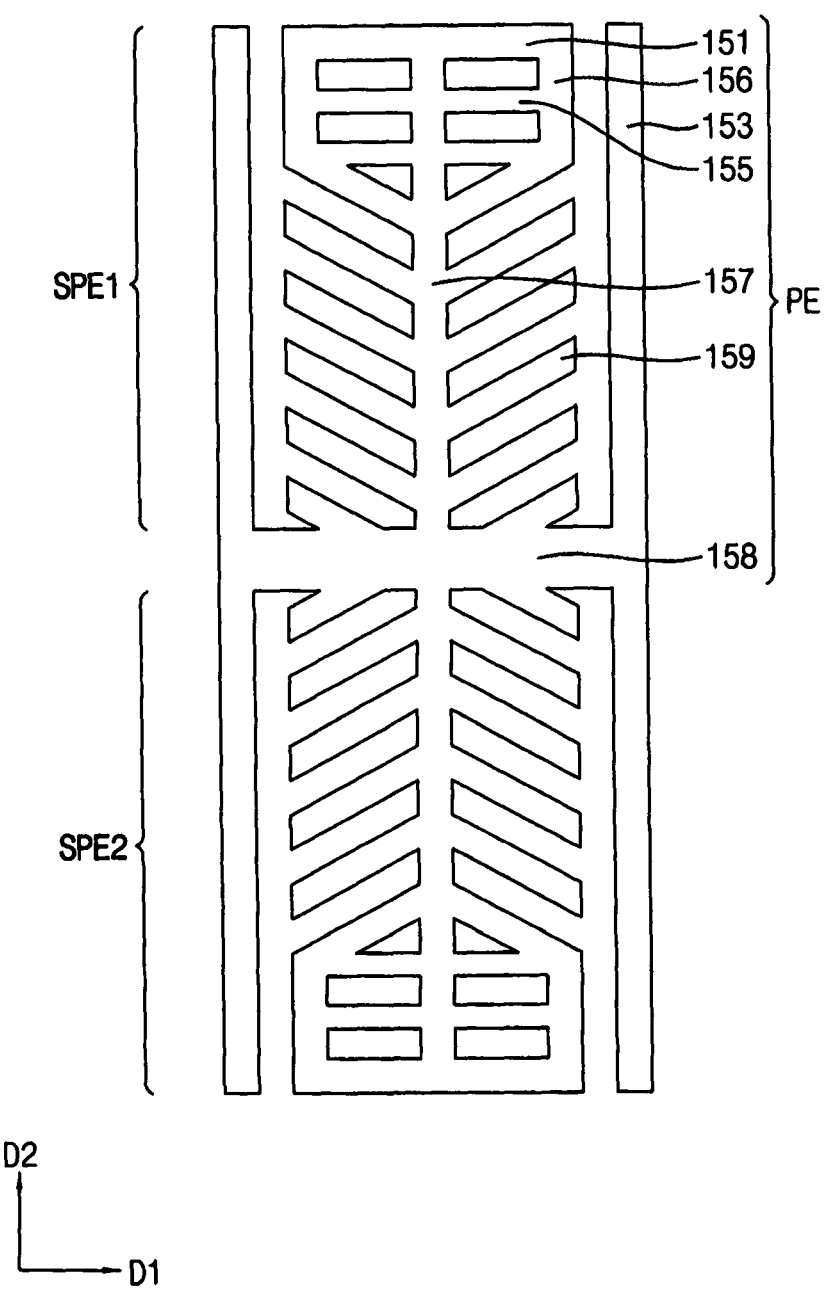
FIG. 15 is a plan view illustrating an exemplary embodiment of a pixel electrode of a display substrate according to the invention.

FIG. 15 is a plan view illustrating a pixel electrode of a display substrate according to an exemplary embodiment of the invention.

The pixel electrode PE according to the illustrated exemplary embodiment is substantially the same as the pixel electrode PE according to the aforementioned exemplary embodiment illustrated in FIG. 11 except for the horizontal internal branch electrode portion 155, the vertical internal branch electrode portion 156 and the oblique internal branch electrode portion 159. Thus, the same reference numerals will be used to refer to same or like parts as those described in the aforementioned exemplary embodiment and any further repetitive explanation concerning the above elements will be omitted.

Referring to FIG. 15, the first sub pixel electrode SPE1 according to the illustrated exemplary embodiment includes two horizontal internal branch electrode portions 155. The end portions (e.g., left and right end portions) of the horizontal internal branch electrode portions 155 are connected to the vertical internal branch electrode portion 156.

Each of the internal electrodes of the first sub pixel electrode SPE1 and the second sub pixel electrode SPE2 includes the horizontal internal branch electrode portion 155 and the oblique internal branch electrode portion 159. The internal electrode is divided as two portions (e.g., left portion and right portion) by the support electrode portion 157, and thus the internal electrode of the first sub pixel electrode SPE1 includes two portions of the horizontal internal branch electrode portion 155 and two portions of the oblique internal branch electrode portion 159. Thus, the internal electrode of the first sub pixel electrode SPE1 is divided as four portions. In addition, since the second sub pixel electrode SPE2 has a shape the same as that of the first sub pixel electrode SPE1, the first sub pixel electrode SPE1 and the second sub pixel electrode SPE2 may have a shape including eight structures. Therefore, the pixel electrode PE may have a division structure divided as eight portions, generates a gamma mixture effect, and thus may improve a side visibility.

Figure 16:
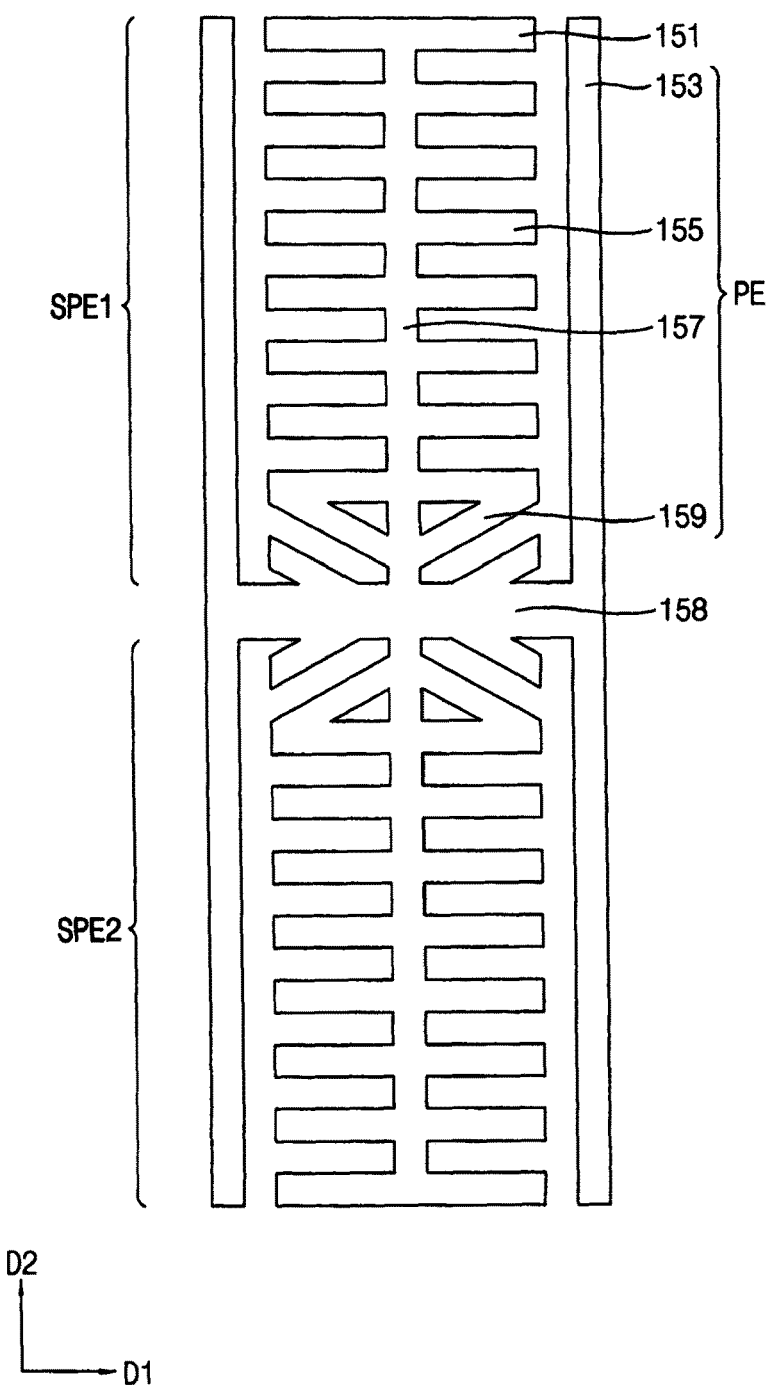
FIG. 16 is a plan view illustrating an exemplary embodiment of a pixel electrode of a display substrate according to the invention.

FIG. 16 is a plan view illustrating a pixel electrode of a display substrate according to an exemplary embodiment of the invention.

The pixel electrode PE according to the illustrated exemplary embodiment is substantially the same as the pixel electrode PE according to the aforementioned exemplary embodiment illustrated in FIG. 11 except for the horizontal internal branch electrode portion 155. Thus, the same reference numerals will be used to refer to same or like parts as those described in the aforementioned exemplary embodiment and any further repetitive explanation concerning the above elements will be omitted.

Referring to FIG. 16, the first sub pixel electrode SPE1 according to the illustrated exemplary embodiment includes two oblique internal branch electrode portions 159. The end portions (e.g., left and right end portions) of the horizontal internal branch electrode portions 155 are not connected to each other.

Each of the internal electrodes of the first sub pixel electrode SPE1 and the second sub pixel electrode SPE2 includes the horizontal internal branch electrode portion 155 and the oblique internal branch electrode portion 159. The internal electrode is divided as two portions (e.g., left portion and right portion) by the support electrode portion 157, and thus the internal electrode of the first sub pixel electrode SPE1 includes two portions of the horizontal internal branch electrode portion 155 and two portions of the oblique internal branch electrode portion 159. Thus, the internal electrode of the first sub pixel electrode SPE1 is divided as four portions. In addition, since the second sub pixel electrode SPE2 has a shape the same as that of the first sub pixel electrode SPE1, the first sub pixel electrode SPE1 and the second sub pixel electrode SPE2 may have a shape including eight structures. Therefore, the pixel electrode PE may have a division structure divided as eight portions, generates a gamma mixture effect, and thus may improve a side visibility.

Figure 17:
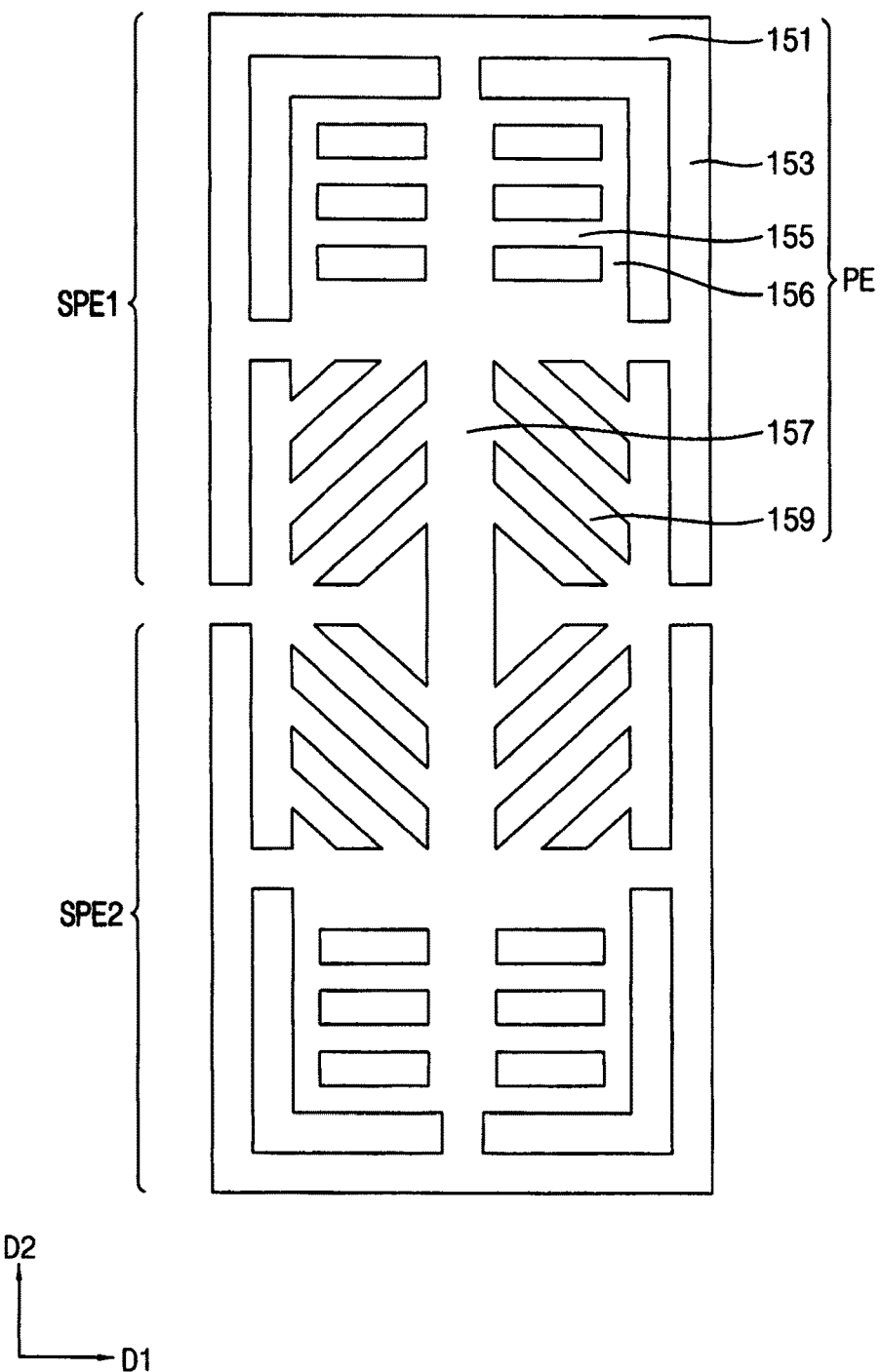
FIG. 17 is a plan view illustrating an exemplary embodiment of a pixel electrode of a display substrate according to the invention.

FIG. 17 is a plan view illustrating a pixel electrode of a display substrate according to an exemplary embodiment of the invention.

The pixel electrode PE according to the illustrated exemplary embodiment is substantially the same as the pixel electrode PE according to the aforementioned exemplary embodiment illustrated in FIG. 8 except for the oblique internal branch electrode portion 159. Thus, the same reference numerals will be used to refer to same or like parts as those described in the aforementioned exemplary embodiment and any further repetitive explanation concerning the above elements will be omitted.

Referring to FIG. 17, the first sub pixel electrode SPE1 according to the illustrated exemplary embodiment includes the oblique internal branch electrode portions 159. The oblique internal branch electrode portion 159 is inclined in a direction far from the horizontal internal branch electrode portions 155.

Each of the internal electrodes of the first sub pixel electrode SPE1 and the second sub pixel electrode SPE2 includes the horizontal internal branch electrode portion 155 and the oblique internal branch electrode portion 159. The internal electrode is divided as two portions (e.g., left portion and right portion) by the support electrode portion 157, and thus the internal electrode of the first sub pixel electrode SPE1 includes two portions of the horizontal internal branch electrode portion 155 and two portions of the oblique internal branch electrode portion 159. Thus, the internal electrode of the first sub pixel electrode SPE1 is divided as four portions. In addition, since the second sub pixel electrode SPE2 has a shape the same as that of the first sub pixel electrode SPE1, the first sub pixel electrode SPE1 and the second sub pixel electrode SPE2 may have a shape including eight structures. Therefore, the pixel electrode PE may have a division structure divided as eight portions, generates a gamma mixture effect, and thus may improve a side visibility.

Figure 18:
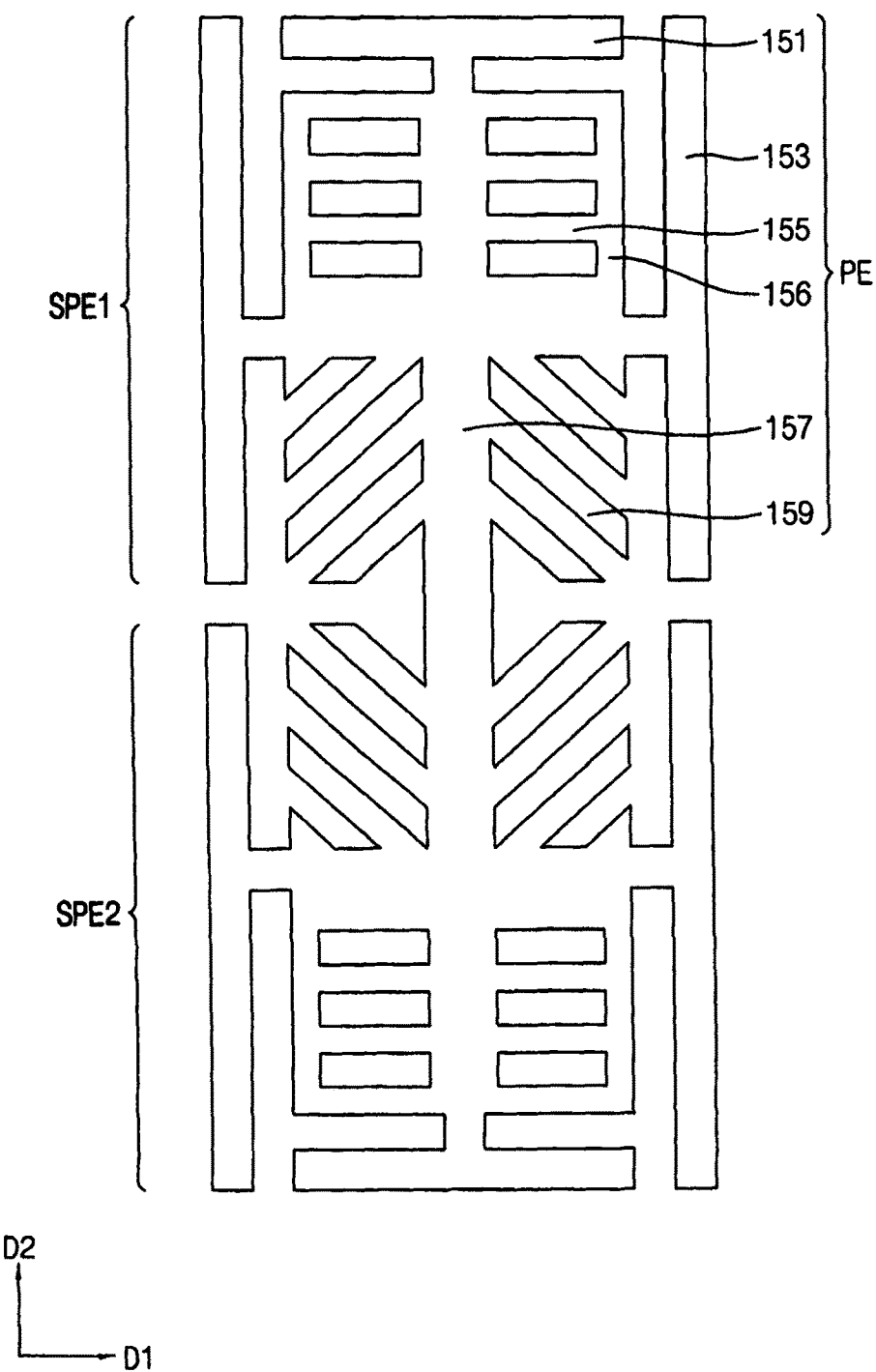
FIG. 18 is a plan view illustrating an exemplary embodiment of a pixel electrode of a display substrate according to the invention.

FIG. 18 is a plan view illustrating a pixel electrode of a display substrate according to an exemplary embodiment of the invention.

The pixel electrode PE according to the illustrated exemplary embodiment is substantially the same as the pixel electrode PE according to the aforementioned exemplary embodiment illustrated in FIG. 8 except for the oblique internal branch electrode portion 159. Thus, the same reference numerals will be used to refer to same or like parts as those described in the aforementioned exemplary embodiment and any further repetitive explanation concerning the above elements will be omitted.

Referring to FIG. 18, the first sub pixel electrode SPE1 according to the illustrated exemplary embodiment includes the oblique internal branch electrode portions 159. The oblique internal branch electrode portion 159 is inclined in a direction far from the horizontal internal branch electrode portions 155.

Each of the internal electrodes of the first sub pixel electrode SPE1 and the second sub pixel electrode SPE2 includes the horizontal internal branch electrode portion 155 and the oblique internal branch electrode portion 159. The internal electrode is divided as two portions (e.g., left portion and right portion) by the support electrode portion 157, and thus the internal electrode of the first sub pixel electrode SPE1 includes two portions of the horizontal internal branch electrode portion 155 and two portions of the oblique internal branch electrode portion 159. Thus, the internal electrode of the first sub pixel electrode SPE1 is divided as four portions. In addition, since the second sub pixel electrode SPE2 has a shape the same as that of the first sub pixel electrode SPE1, the first sub pixel electrode SPE1 and the second sub pixel electrode SPE2 may have a shape including eight structures. Therefore, the pixel electrode PE may have a division structure divided as eight portions, generates a gamma mixture effect, and thus may improve a side visibility.

Figure 19:
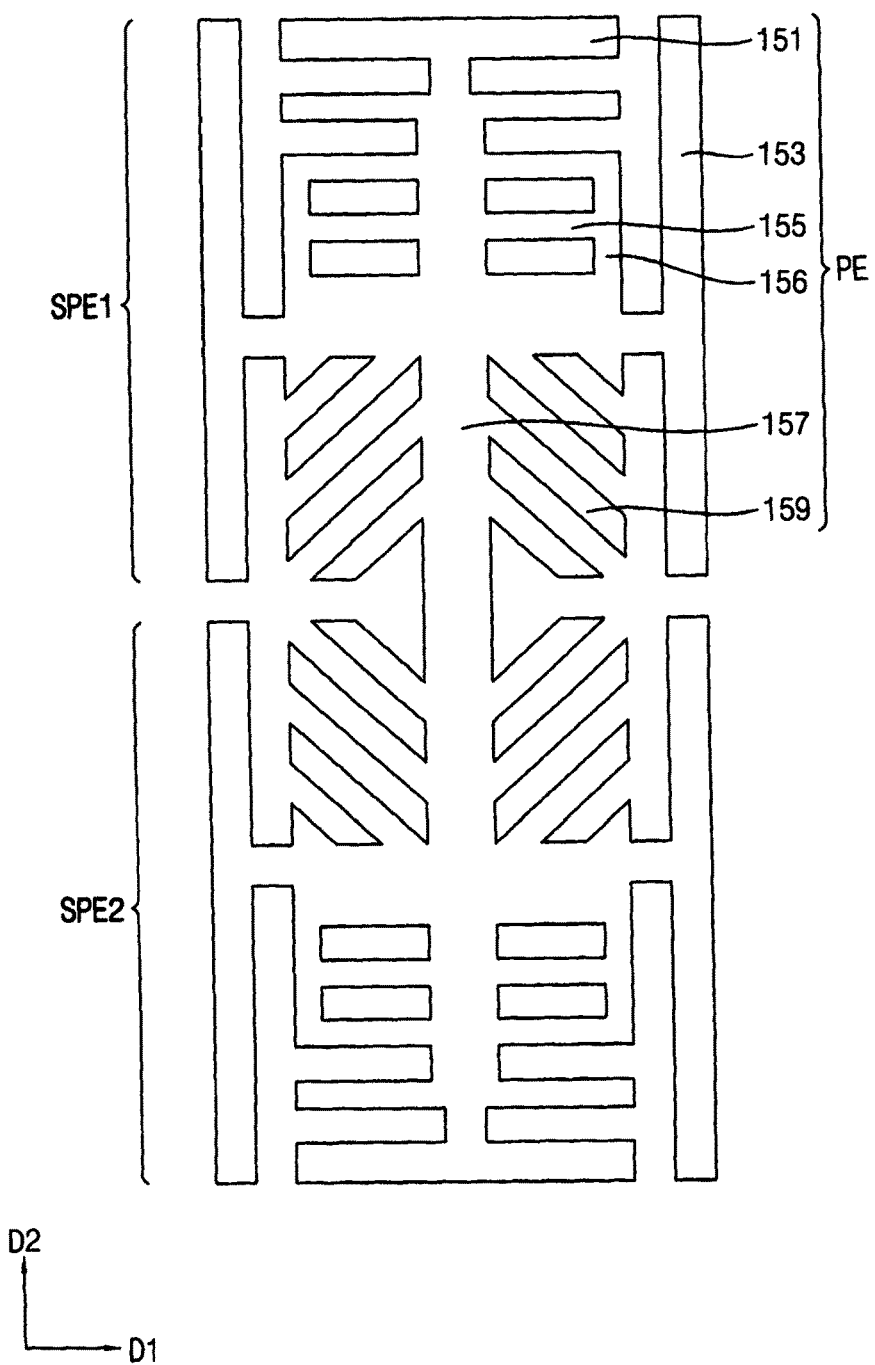
FIG. 19 is a plan view illustrating an exemplary embodiment of a pixel electrode of a display substrate according to the invention.

FIG. 19 is a plan view illustrating a pixel electrode of a display substrate according to an exemplary embodiment of the invention.

The pixel electrode PE according to the illustrated exemplary embodiment is substantially the same as the pixel electrode PE according to the aforementioned exemplary embodiment illustrated in FIG. 10 except for the oblique internal branch electrode portion 159. Thus, the same reference numerals will be used to refer to same or like parts as those described in the aforementioned exemplary embodiment and any further repetitive explanation concerning the above elements will be omitted.

Referring to FIG. 19, the first sub pixel electrode SPE1 according to the illustrated exemplary embodiment includes the oblique internal branch electrode portions 159. The oblique internal branch electrode portion 159 is inclined in a direction far from the horizontal internal branch electrode portions 155.

Each of the internal electrodes of the first sub pixel electrode SPE1 and the second sub pixel electrode SPE2 includes the horizontal internal branch electrode portion 155 and the oblique internal branch electrode portion 159. The internal electrode is divided as two portions (e.g., left portion and right portion) by the support electrode portion 157, and thus the internal electrode of the first sub pixel electrode SPE1 includes two portions of the horizontal internal branch electrode portion 155 and two portions of the oblique internal branch electrode portion 159. Thus, the internal electrode of the first sub pixel electrode SPE1 is divided as four portions. In addition, since the second sub pixel electrode SPE2 has a shape the same as that of the first sub pixel electrode SPE1, the first sub pixel electrode SPE1 and the second sub pixel electrode SPE2 may have a shape including eight structures. Therefore, the pixel electrode PE may have a division structure divided as eight portions, generates a gamma mixture effect, and thus may improve a side visibility.

Figure 20:
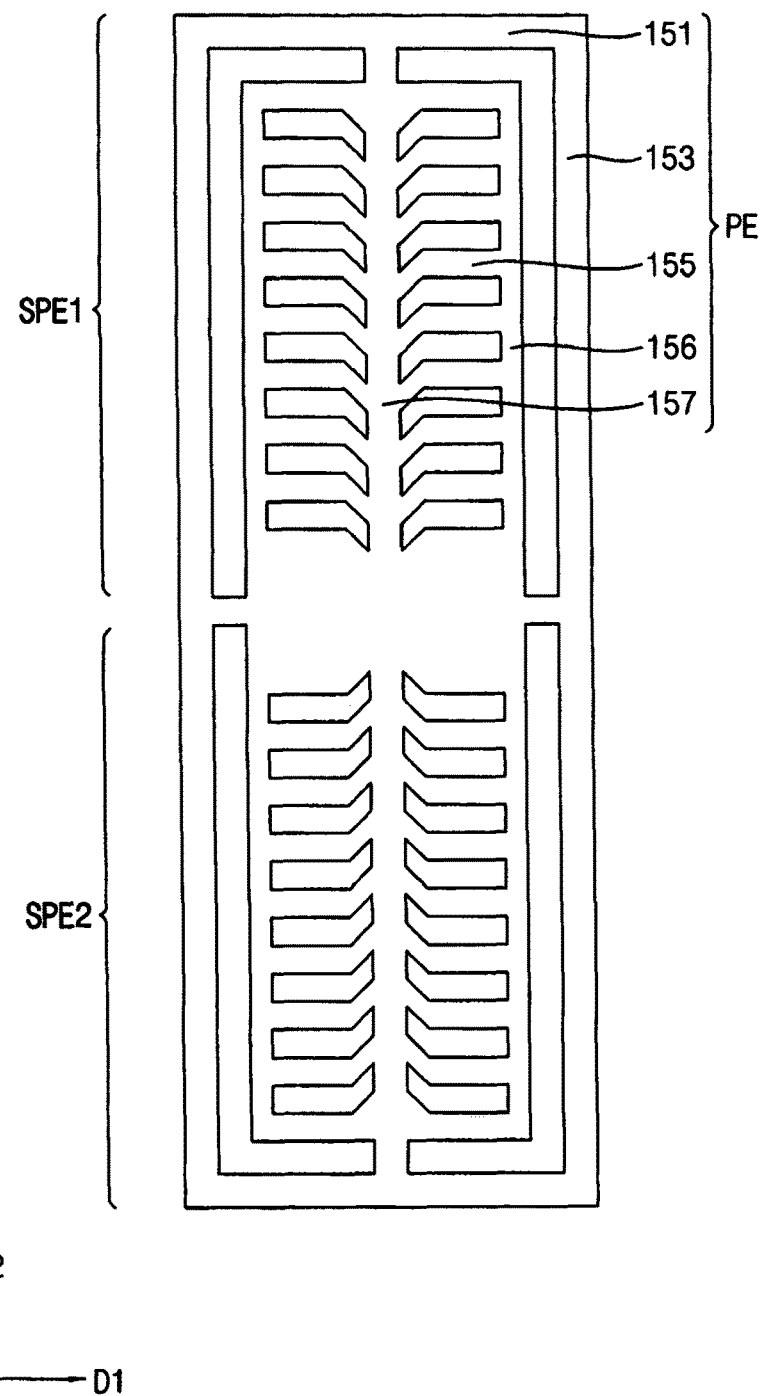
FIG. 20 is a plan view illustrating an exemplary embodiment of a pixel electrode of a display substrate according to the invention.

FIG. 20 is a plan view illustrating a pixel electrode of a display substrate according to an exemplary embodiment of the invention.

The pixel electrode PE according to the illustrated exemplary embodiment is substantially the same as the pixel electrode PE according to the aforementioned exemplary embodiment illustrated in FIG. 8 except for the internal electrode and the vertical external branch electrode portion 153. Thus, the same reference numerals will be used to refer to same or like parts as those described in the aforementioned exemplary embodiment and any further repetitive explanation concerning the above elements will be omitted.

Referring to FIG. 20, the internal electrode according to the illustrated exemplary embodiment includes the horizontal internal branch electrode portion 155 having a straight portion and an oblique portion. The vertical external branch electrode portion 153 of the first sub pixel electrode SPE1 is connected to the vertical external branch electrode portion of the second sub pixel electrode SPE2. Thus, the external electrode may have a closed shape.

Each of the internal electrodes of the first sub pixel electrode SPE1 and the second sub pixel electrode SPE2 may have a shape including two equal structures. Thus, the first sub pixel electrode SPE1 and the second sub pixel electrode SPE2 may have a shape including four equal structures (i.e., upper left, upper right, lower left and lower right structures). Therefore, the pixel electrode PE may have a division structure divided as four portions, generates a gamma mixture effect, and thus may improve a side visibility.

Figure 21:
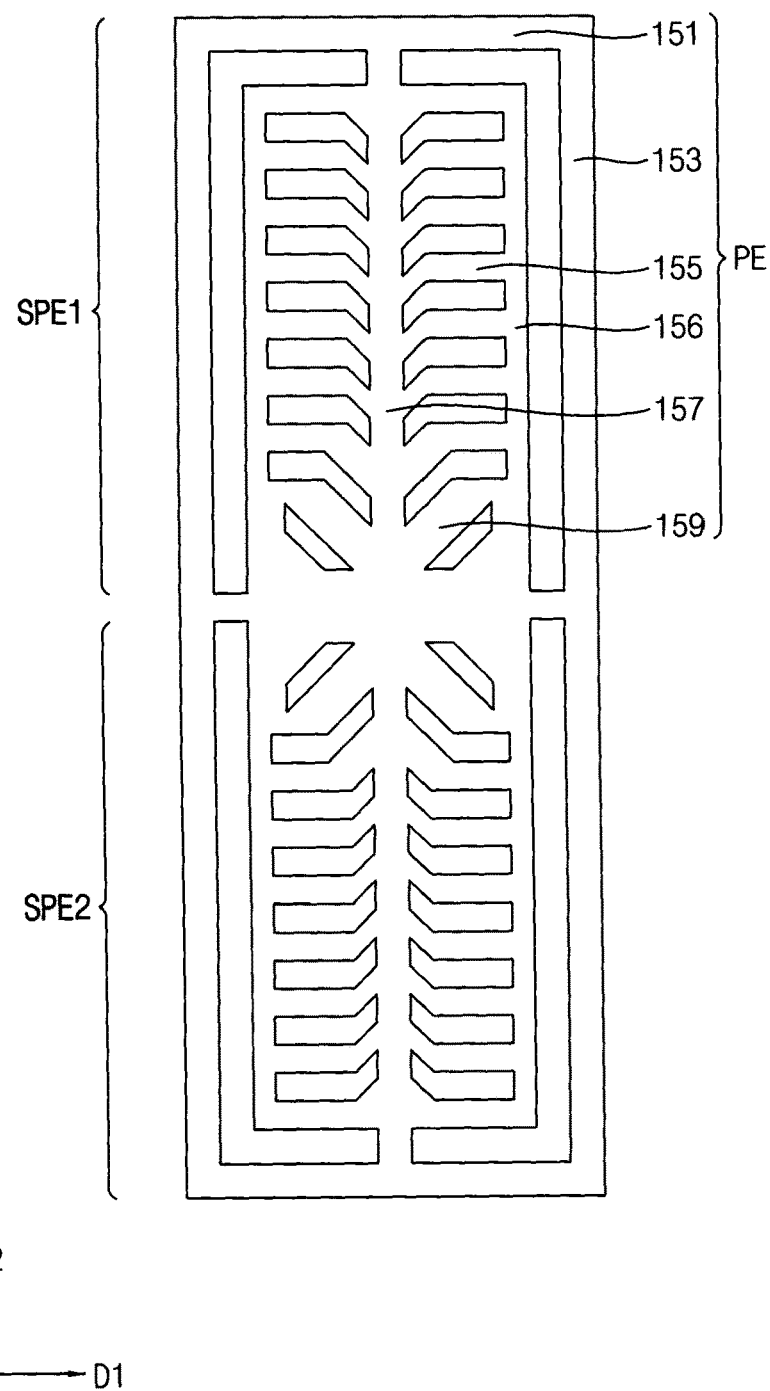
FIG. 21 is a plan view illustrating an exemplary embodiment of a pixel electrode of a display substrate according to the invention.

FIG. 21 is a plan view illustrating a pixel electrode of a display substrate according to an exemplary embodiment of the invention.

The pixel electrode PE according to the illustrated exemplary embodiment is substantially the same as the pixel electrode PE according to the aforementioned exemplary embodiment illustrated in FIG. 20 except for the oblique internal branch electrode portion 159. Thus, the same reference numerals will be used to refer to same or like parts as those described in the aforementioned exemplary embodiment and any further repetitive explanation concerning the above elements will be omitted.

Referring to FIG. 21, the internal electrode according to the illustrated exemplary embodiment includes the oblique internal branch electrode portion 159 and the horizontal internal branch electrode portion 155 having a straight portion and an oblique portion. The vertical external branch electrode portion 153 of the first sub pixel electrode SPE1 is connected to the vertical external branch electrode portion of the second sub pixel electrode SPE2. Thus, the external electrode may have a closed shape.

Each of the internal electrodes of the first sub pixel electrode SPE1 and the second sub pixel electrode SPE2 may have a shape including two equal structures. Thus, the first sub pixel electrode SPE1 and the second sub pixel electrode SPE2 may have a shape including four equal structures (i.e., upper left, upper right, lower left and lower right structures). Therefore, the pixel electrode PE may have a division structure divided as four portions, generates a gamma mixture effect, and thus may improve a side visibility.

Figure 22:
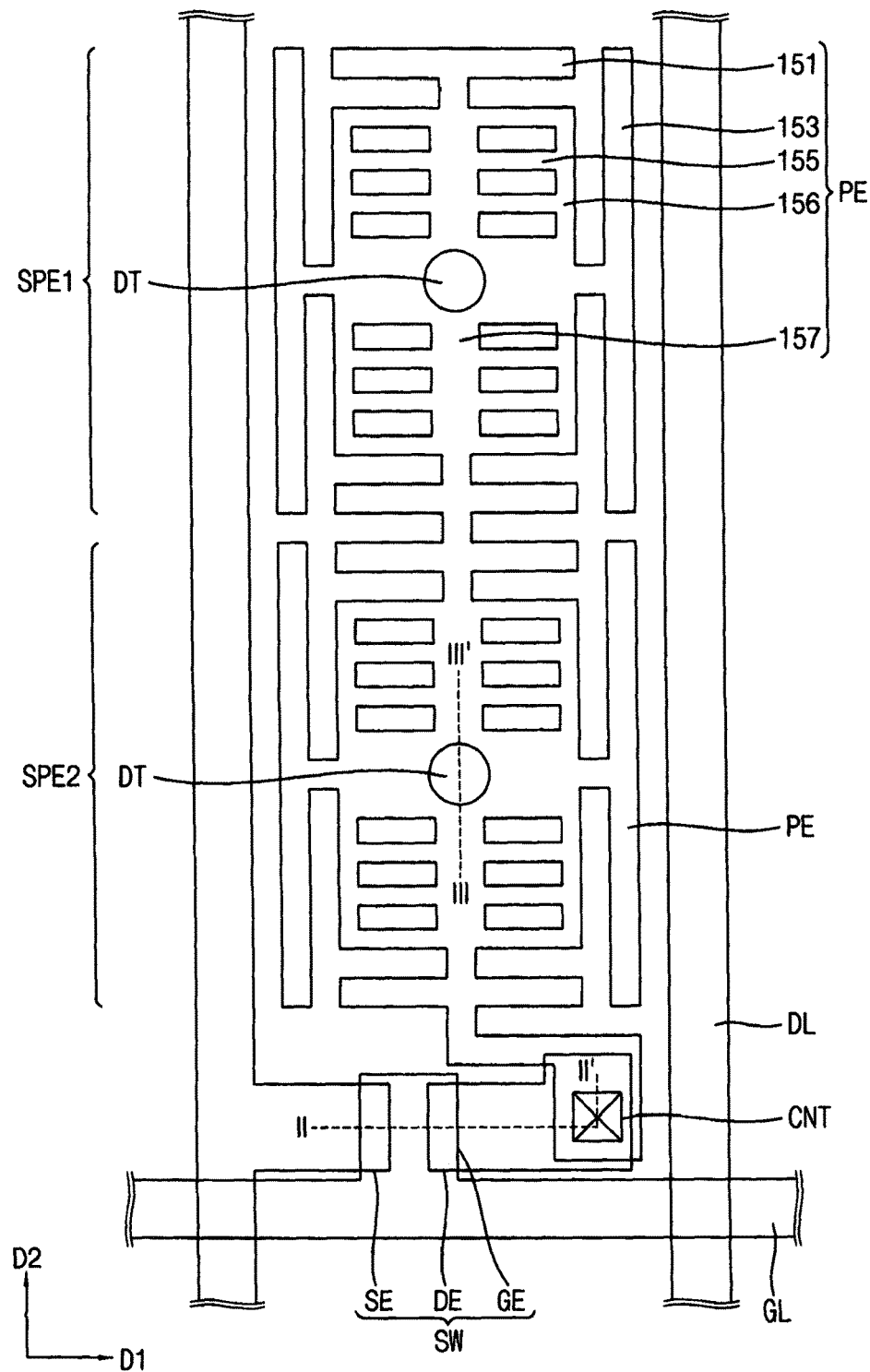
FIG. 22 is a plan view illustrating an exemplary embodiment of a display substrate according to the invention.
Figure 23:
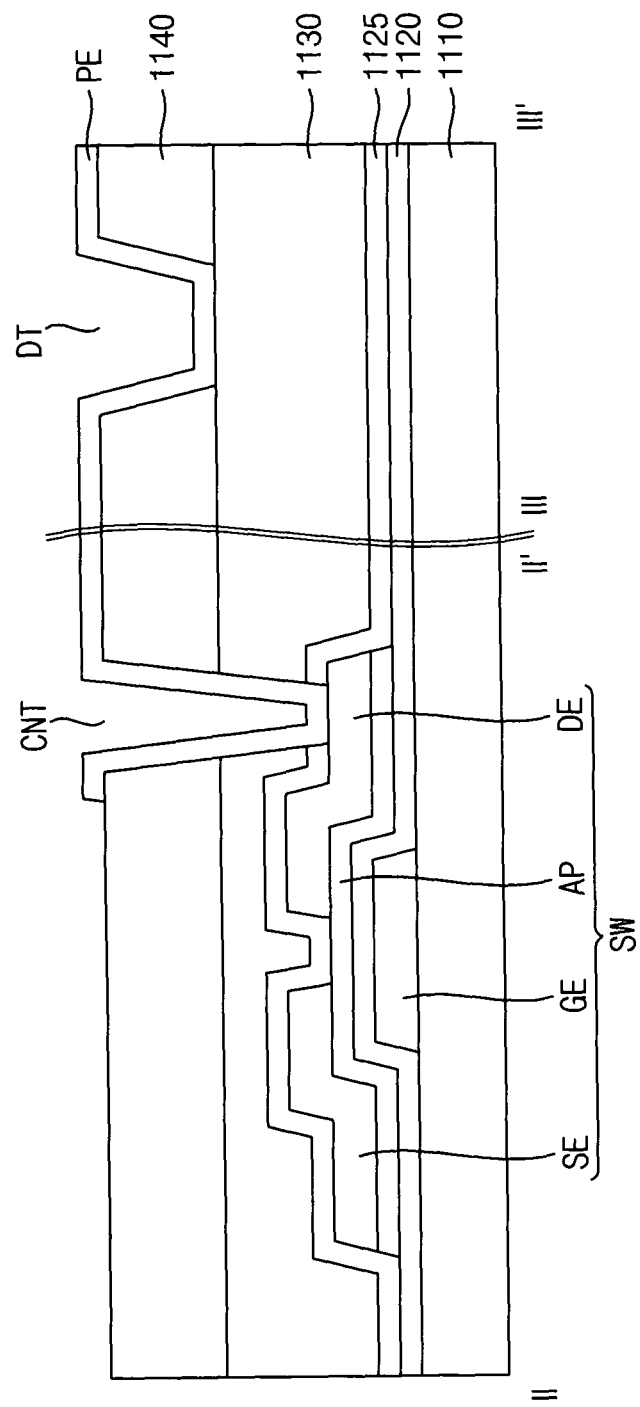
FIG. 23 is a cross-sectional view taken along line II-II' and line III-III' of FIG. 22.

FIG. 22 is a plan view illustrating a display substrate according to an exemplary embodiment of the invention. FIG. 23 is a cross-sectional view taken along line II-II' and line III-III' of FIG. 22.

The display substrate according to the illustrated exemplary embodiment is substantially the same as the display substrate according to the aforementioned exemplary embodiment illustrated in FIGS. 1 and 2. Thus, the same reference numerals will be used to refer to same or like parts as those described in the aforementioned exemplary embodiment and any further repetitive explanation concerning the above elements will be omitted.

Referring to FIGS. 22 and 23, the display substrate according to the illustrated exemplary embodiment includes a gate line GL, a data line DL crossing the gate line GL, a TFT SW which is a switching device and a pixel electrode PE. The TFT SW is connected to the gate line GL and the data line DL. The pixel electrode PE is connected to the TFT SW through a contact hole CNT.

An organic layer 1140 is disposed on a color filter layer 1130. The organic layer 1140 substantially planarizes an upper surface of the display substrate, and thus may prevent problems due to a step difference, such as a disconnection of a signal line. The organic layer 1140 may be an insulation layer including an organic material.

A concave pattern DT is defined in the organic layer 1140. The concave pattern DT is defined by partially patterning the organic layer 1140. The concave pattern DT may be defined in an area corresponding to a central portion of the first sub pixel electrode SPE1 and a central portion of the second sub pixel electrode SPE2.

In the illustrated exemplary embodiment, two concave patterns DT may be defined in the organic layer 1140. A thickness of the organic layer 1140 may be changed by the concave pattern DT. The concave pattern DT may control a liquid crystal particle disposed on the organic layer 1140, and thus the concave pattern DT may improve a side visibility.

A pixel electrode PE is disposed on a base substrate 1110 on which the concave pattern DT is defined. The pixel electrode PE may include a transparent conductive material. In an exemplary embodiment, the pixel electrode PE may include ITO or IZO, for example.

The pixel electrode PE may include a first sub pixel electrode SPE1 and a second sub pixel electrode SPE2. The pixel electrode PE according to the illustrated exemplary embodiment is substantially the same as the pixel electrode PE of the exemplary embodiments described above, and thus any further repetitive explanation concerning the pixel electrode PE will be omitted.

FIGS. 24 to 28 are cross-sectional views illustrating a method of manufacturing the display substrate of FIG. 22.

Figure 24:
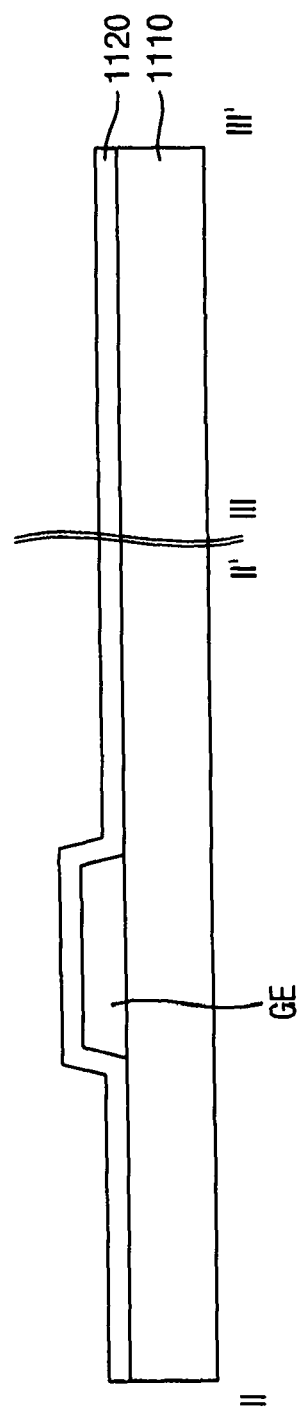
FIGS. 24 to 28 are cross-sectional views illustrating a method of manufacturing the display substrate of FIG. 22.

Referring to FIG. 24, a gate electrode GE and a first insulation layer 1120 are disposed on a base substrate 1110.

In an exemplary embodiment, a gate metal layer is disposed on the base substrate 1110, and the gate metal layer is patterned, to form a gate line and the gate electrode GE, for example. A glass substrate, a quartz substrate, a silicon substrate, a plastic substrate, and the like may be used as the base substrate 1110.

In an exemplary embodiment, the gate metal layer may include copper (Cu), silver (Ag), chrome (Cr), molybdenum (Mo), aluminum (Al), titanium (Ti), manganese (Mn), aluminum (Al), and/or an alloy thereof, for example. The gate metal layer may have a single layer structure or a multi layer structure having a plurality of metal layers including materials different from each other. In an exemplary embodiment, the gate metal layer may include a copper layer and a titanium layer disposed on an upper portion and/or a lower portion of the copper layer, for example.

Next, the first insulation layer 1120 covers the gate line and the gate electrode GE. The first insulation layer 1120 may include silicon nitride, silicon oxide, and the like. The first insulation layer 1120 may have a single layer structure or a multi layer structure. In an exemplary embodiment, the first insulation layer 1120 may include a lower insulation layer having silicon nitride and an upper insulation layer having silicon oxide, for example.

Figure 25:
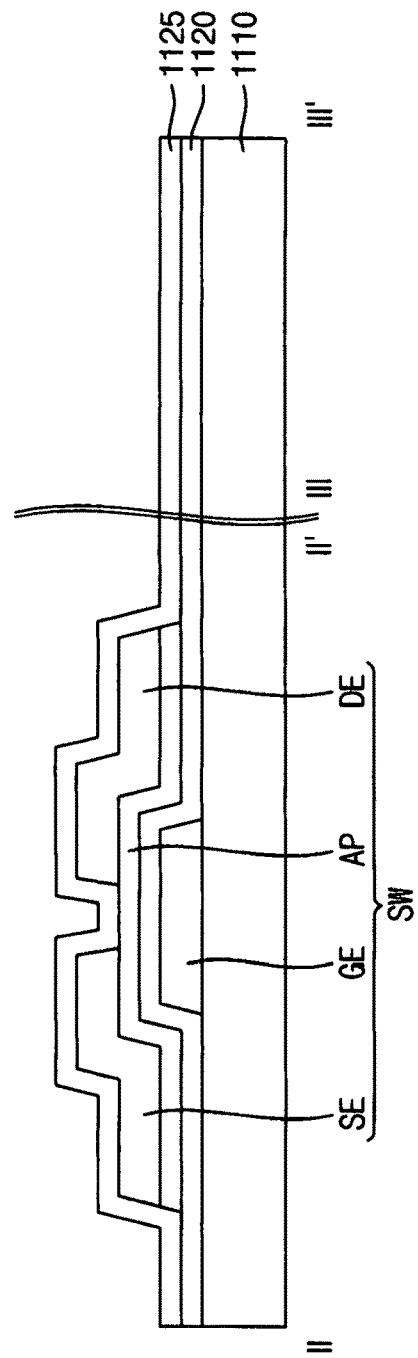

Referring to FIG. 25, an active pattern AP, a source electrode SE, a drain electrode DE and a second insulation layer 1125 are disposed on the base substrate 1110 on which the first insulation layer 1120 is disposed.

The active pattern AP is disposed on the first insulation layer 1120. The active pattern AP may include an oxide semiconductor. In an exemplary embodiment, the oxide semiconductor may include zinc oxide (ZnO), zinc tin oxide ("ZTO"), ZIO, indium oxide (InO), titanium oxide (TiO), IGZO or IZTO, for example. The above-mentioned materials may be used as a single or may be mixed and used. Preferably, the oxide semiconductor may include indium gallium zinc oxide, for example.

A source metal pattern is provided on the active pattern AP. The source metal pattern may include the data line DL, the source electrode SE and the drain electrode DE. The data line DL is electrically connected to the source electrode SE. In an exemplary embodiment, the source electrode SE may be protruded from the data line DL in the first direction D1, for example. The data line DL may be disposed on the layer on which the source electrode SE and the drain electrode DE are disposed.

The second insulation layer 1125 is disposed on the source electrode SE and the drain electrode DE. The second insulation layer 1125 may include an inorganic material. In an exemplary embodiment, the second insulation layer 1125 may include silicon oxide (SiOx) or silicon nitride (SiNx), for example. In an exemplary embodiment, the second insulation layer 1125 may include silicon oxide (SiOx), and may have a thickness of about 500 Å, for example. In an exemplary embodiment, the second insulation layer 1125 may have a multi layer structure including materials different from each other.

Figure 26:
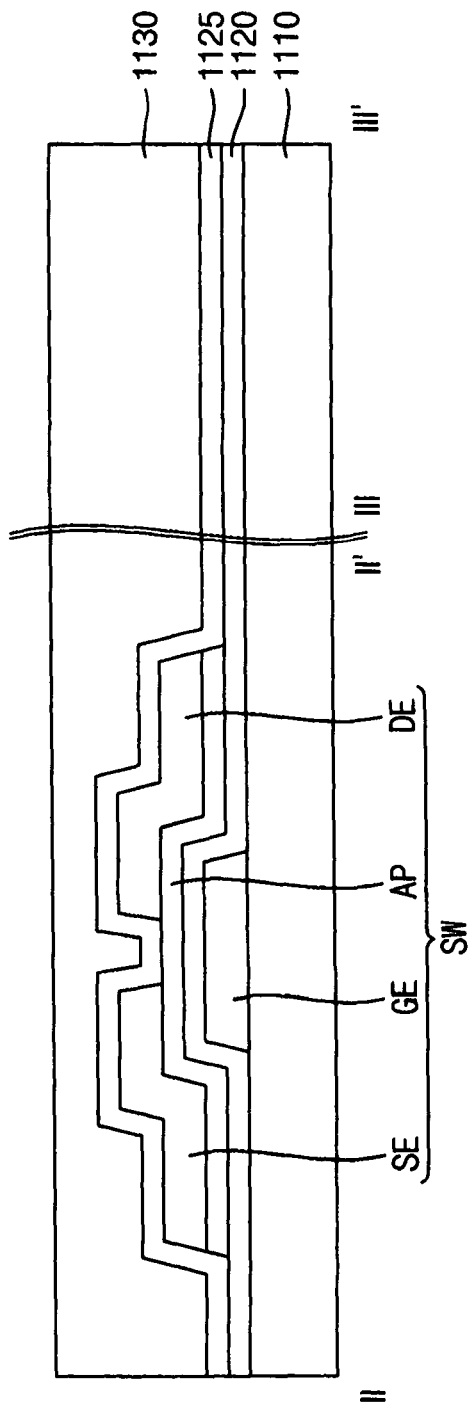

Referring to FIG. 26, the color filter layer 1130 is disposed on the base substrate 1110 on which the second insulation layer 1125 is disposed.

The color filter layer 1130 is disposed on the second insulation layer 1125. The color filter layer 1130 may include a first sub color filter layer, a second sub color filter layer and a third sub color filter layer.

In an exemplary embodiment, the first sub color filter layer may include a red material, for example. In an exemplary embodiment, the second sub color filter layer may include a green material, for example. In an exemplary embodiment, the third sub color filter layer may include a blue material, for example. However, the invention is not limited thereto, and the first to third sub color filter layers may include various other color materials. The second sub color filter layer may be adjacent to the first sub color filter layer. The third sub color filter layer may be adjacent to the second sub color filter layer. The first sub color filter layer, the second sub color filter layer and the third sub color filter layer may be sequentially provided to form the color filter layer 1130.

Figure 27:
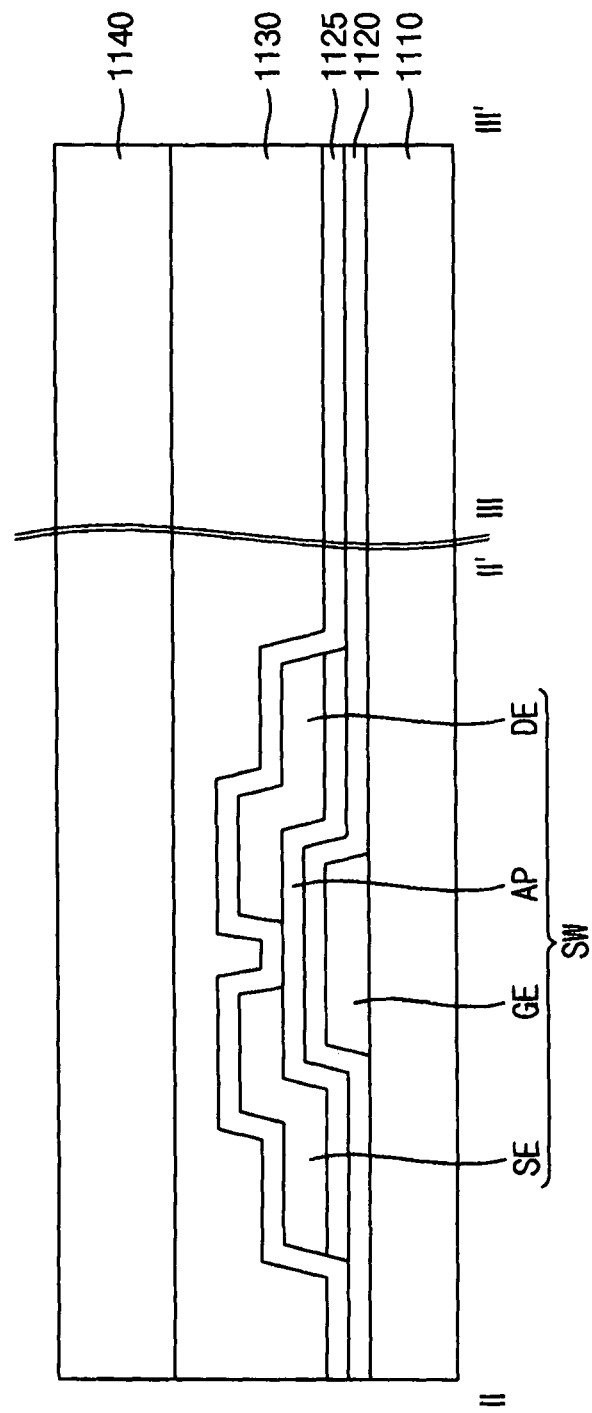

Referring to FIG. 27, the organic layer 1140 is disposed on the base substrate 1110 on which the color filter layer 1130 is disposed.

The organic layer 1140 is disposed on the color filter layer 1130. The organic layer 1140 substantially planarizes an upper surface of the display substrate, and thus may prevent problems due to a step difference, such as a disconnection of a signal line. The organic layer 1140 may be an insulation layer including an organic material.

Figure 28:
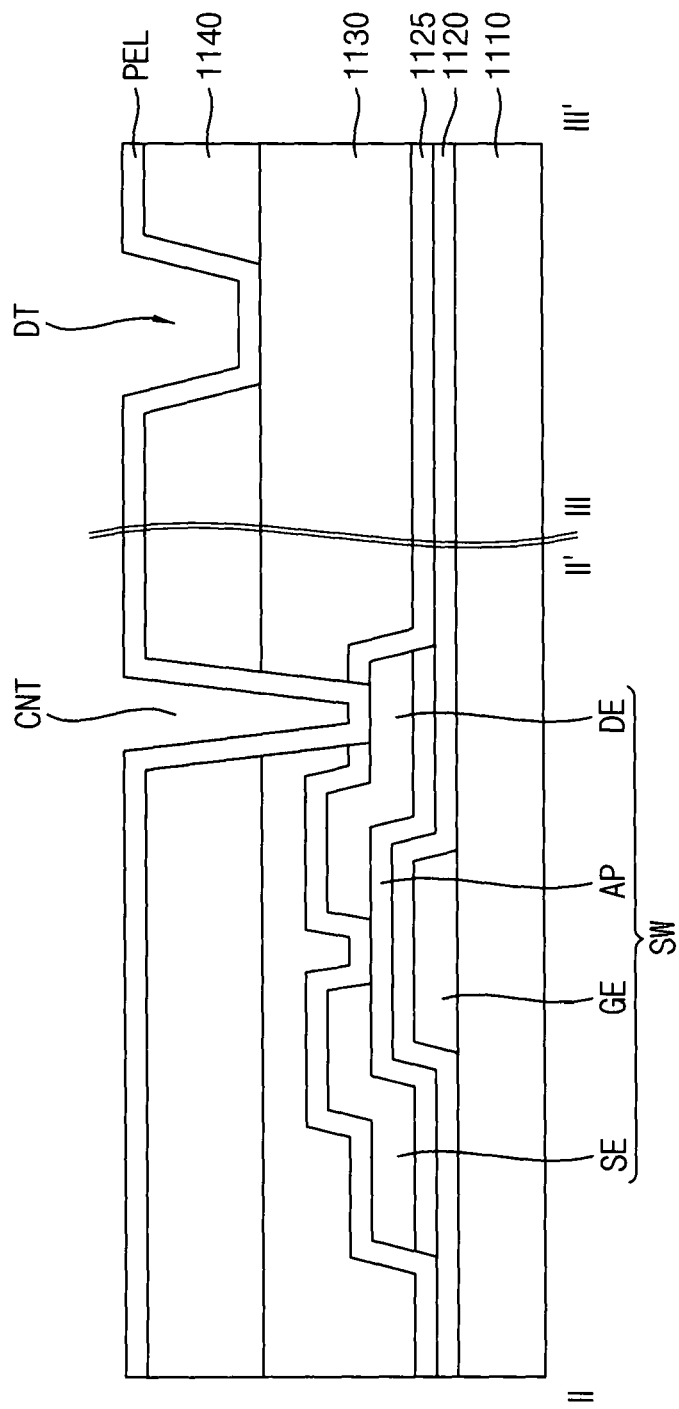

Referring to FIG. 28, the concave pattern DT is defined by patterning the organic layer 1140. Next, a transparent electrode layer PEL is disposed on the base substrate 1110 on which the concave pattern DT is defined.

The concave pattern DT is defined in the organic layer 1140. The concave pattern DT is defined by partially patterning the organic layer 1140. The concave pattern DT may be defined in an area corresponding to a central portion of the first sub pixel electrode SPE1 and a central portion of the second sub pixel electrode SPE2.

In the illustrated exemplary embodiment, two concave patterns DT may be defined in the organic layer 1140. A thickness of the organic layer 1140 may be changed by the concave pattern DT. The concave pattern DT may control a liquid crystal particle disposed on the organic layer 1140, and thus the concave pattern DT may improve a side visibility.

The transparent electrode layer PEL is disposed on the base substrate 1110 on which the concave pattern DT is defined. The transparent electrode layer PEL may include a transparent conductive material. In an exemplary embodiment, the transparent electrode layer PEL may include ITO or IZO, for example.

Referring to FIG. 22, the pixel electrode PE is provided by patterning the transparent conductive layer PEL.

The pixel electrode PE may include a transparent conductive material. In an exemplary embodiment, the pixel electrode PE may include ITO or IZO, for example.

The pixel electrode PE is electrically connected to the drain electrode DE partially exposed through the contact hole CNT defined through the organic layer 1140, the color filter layer 1130 and the second insulation layer 1125.

Figure 29:
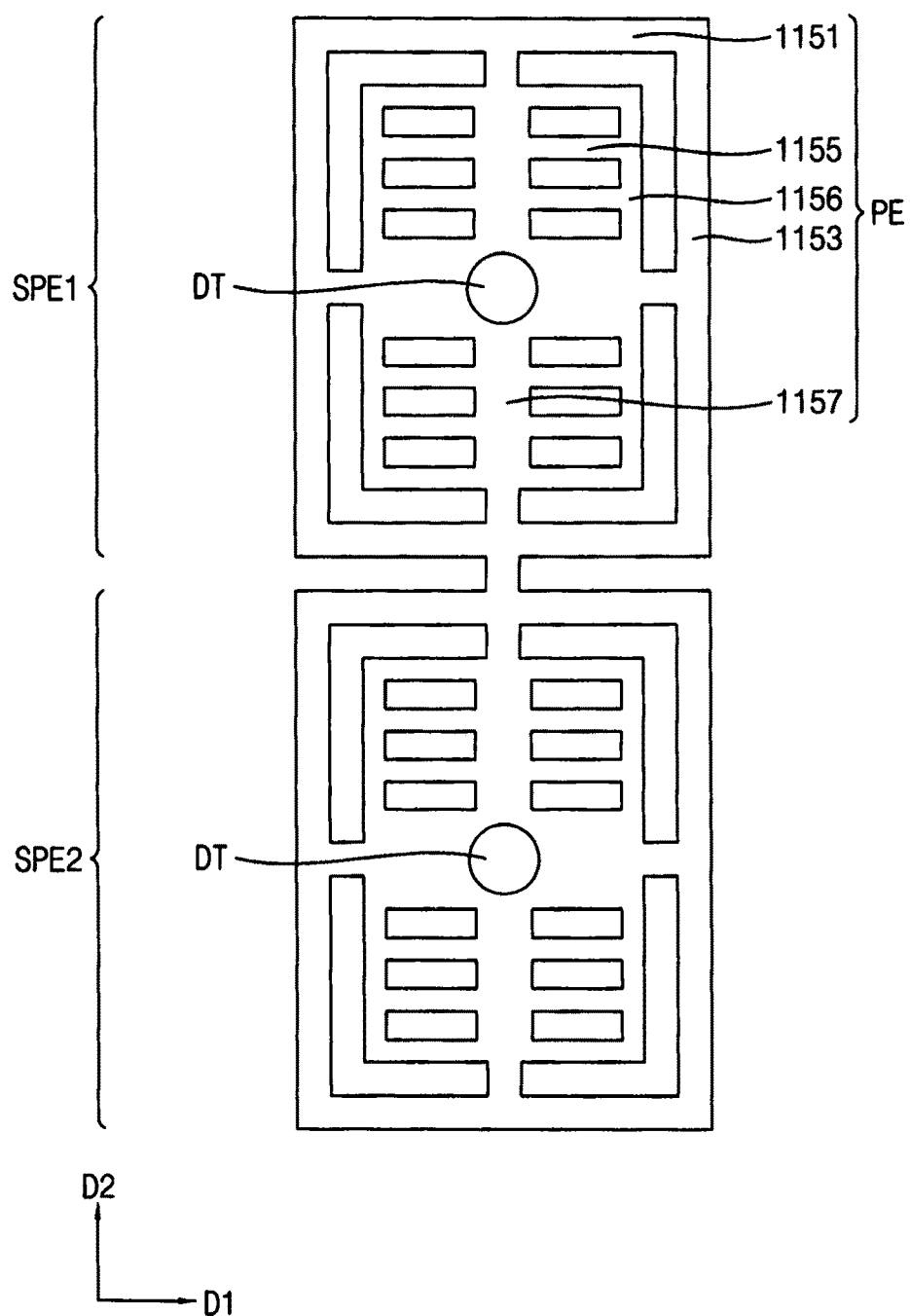
FIG. 29 is a plan view illustrating an exemplary embodiment of a pixel electrode and a concave pattern of a display substrate according to the invention.

FIG. 29 is a plan view illustrating a pixel electrode and a concave pattern of a display substrate according to an exemplary embodiment of the invention.

The pixel electrode PE according to the illustrated exemplary embodiment is substantially the same as the pixel electrode PE according to the aforementioned exemplary embodiment illustrated in FIG. 8 except for the concave pattern DT. The pixel electrode PE may include the horizontal external branch electrode portion 1151, the vertical external branch electrode portion 1153, the horizontal internal branch electrode portion 1155, the vertical internal branch electrode portion 1156, the support electrode portion 1157 similar to the horizontal external branch electrode portion 151, the vertical external branch electrode portion 153, the horizontal internal branch electrode portion 155, the vertical internal branch electrode portion 156, the support electrode portion 157 of the aforementioned exemplary embodiments, for example. Thus, the same or similar reference numerals will be used to refer to same or like parts as those described in the aforementioned exemplary embodiment and any further repetitive explanation concerning the above elements will be omitted.

Referring to FIGS. 23 and 29, the concave pattern DT is defined in the organic layer 1140. The concave pattern DT is defined by partially patterning the organic layer 1140. The concave pattern DT may be defined in an area corresponding to a central portion of the first sub pixel electrode SPE1 and a central portion of the second sub pixel electrode SPE2.

In the illustrated exemplary embodiment, two concave patterns DT may be defined in the organic layer 1140. A thickness of the organic layer 1140 may be changed by the concave pattern DT. The concave pattern DT may control a liquid crystal particle disposed on the organic layer 1140, and thus the concave pattern DT may improve a side visibility.

Figure 30:
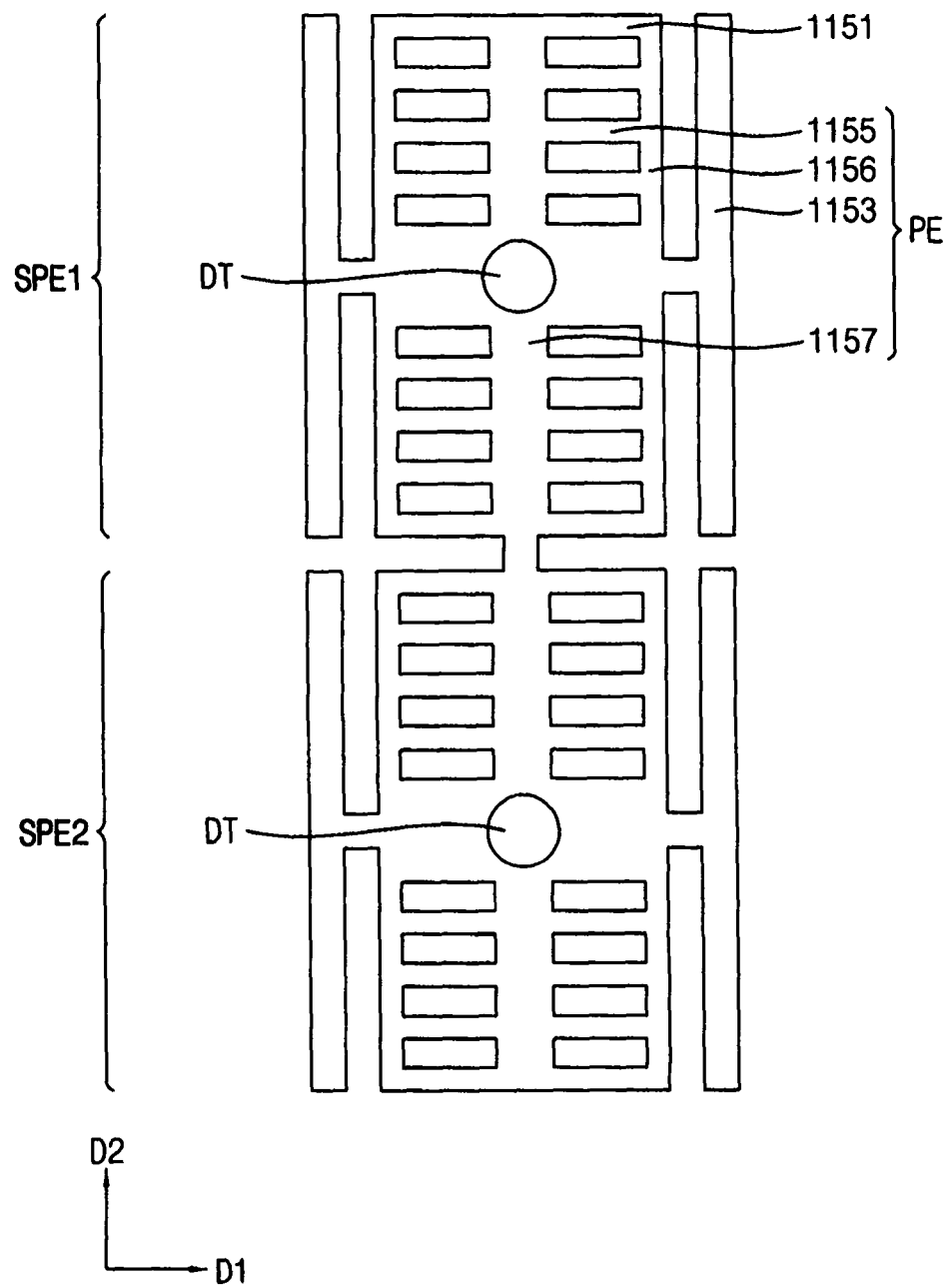
FIG. 30 is a plan view illustrating an exemplary embodiment of a pixel electrode and a concave pattern of a display substrate according to the invention.

FIG. 30 is a plan view illustrating a pixel electrode and a concave pattern of a display substrate according to an exemplary embodiment of the invention.

The pixel electrode PE according to the illustrated exemplary embodiment is substantially the same as the pixel electrode PE according to the aforementioned exemplary embodiment illustrated in FIG. 9 except for the concave pattern DT. Thus, the same or similar reference numerals will be used to refer to same or like parts as those described in the aforementioned exemplary embodiment and any further repetitive explanation concerning the above elements will be omitted.

Referring to FIGS. 23 and 30, the concave pattern DT is defined in the organic layer 1140. The concave pattern DT is defined by partially patterning the organic layer 1140. The concave pattern DT may be defined in an area corresponding to a central portion of the first sub pixel electrode SPE1 and a central portion of the second sub pixel electrode SPE2.

In the illustrated exemplary embodiment, two concave patterns DT may be defined in the organic layer 1140. A thickness of the organic layer 1140 may be changed by the concave pattern DT. The concave pattern DT may control a liquid crystal particle disposed on the organic layer 1140, and thus the concave pattern DT may improve a side visibility.

Figure 31:
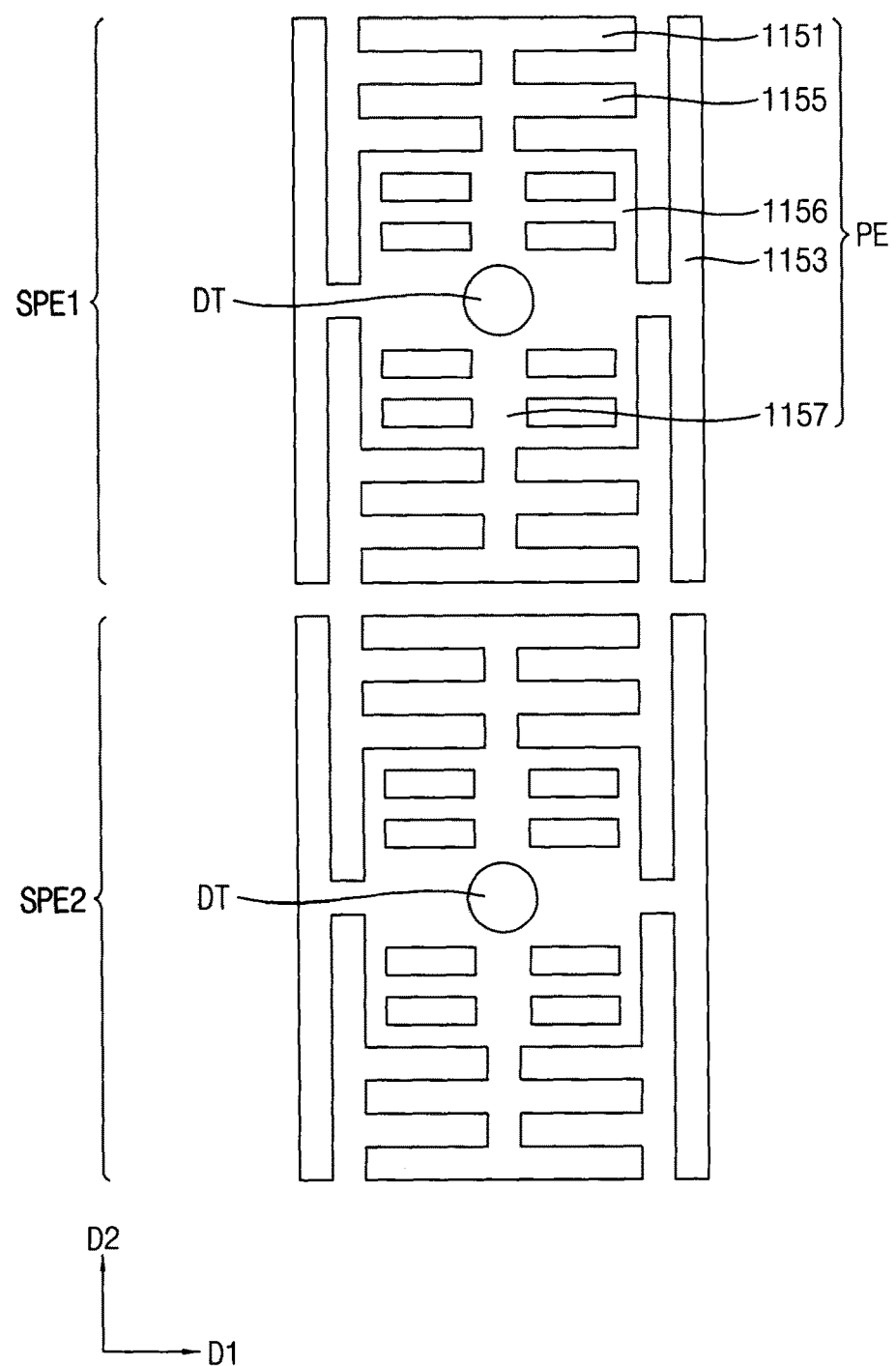
FIG. 31 is a plan view illustrating an exemplary embodiment of a pixel electrode and a concave pattern of a display substrate according to the invention.

FIG. 31 is a plan view illustrating a pixel electrode and a concave pattern of a display substrate according to an exemplary embodiment of the invention.

The pixel electrode PE according to the exemplary embodiment is substantially the same as the pixel electrode PE according to the aforementioned exemplary embodiment illustrated in FIG. 10 except for the concave pattern DT. Thus, the same or similar reference numerals will be used to refer to same or like parts as those described in the aforementioned exemplary embodiment and any further repetitive explanation concerning the above elements will be omitted.

Referring to FIGS. 23 and 31, the concave pattern DT is defined in the organic layer 1140. The concave pattern DT is defined by partially patterning the organic layer 1140. The concave pattern DT may be defined in an area corresponding to a central portion of the first sub pixel electrode SPE1 and a central portion of the second sub pixel electrode SPE2.

In the illustrated exemplary embodiment, two concave patterns DT may be defined in the organic layer 1140. A thickness of the organic layer 1140 may be changed by the concave pattern DT. The concave pattern DT may control a liquid crystal particle disposed on the organic layer 1140, and thus the concave pattern DT may improve a side visibility.

Figure 32:
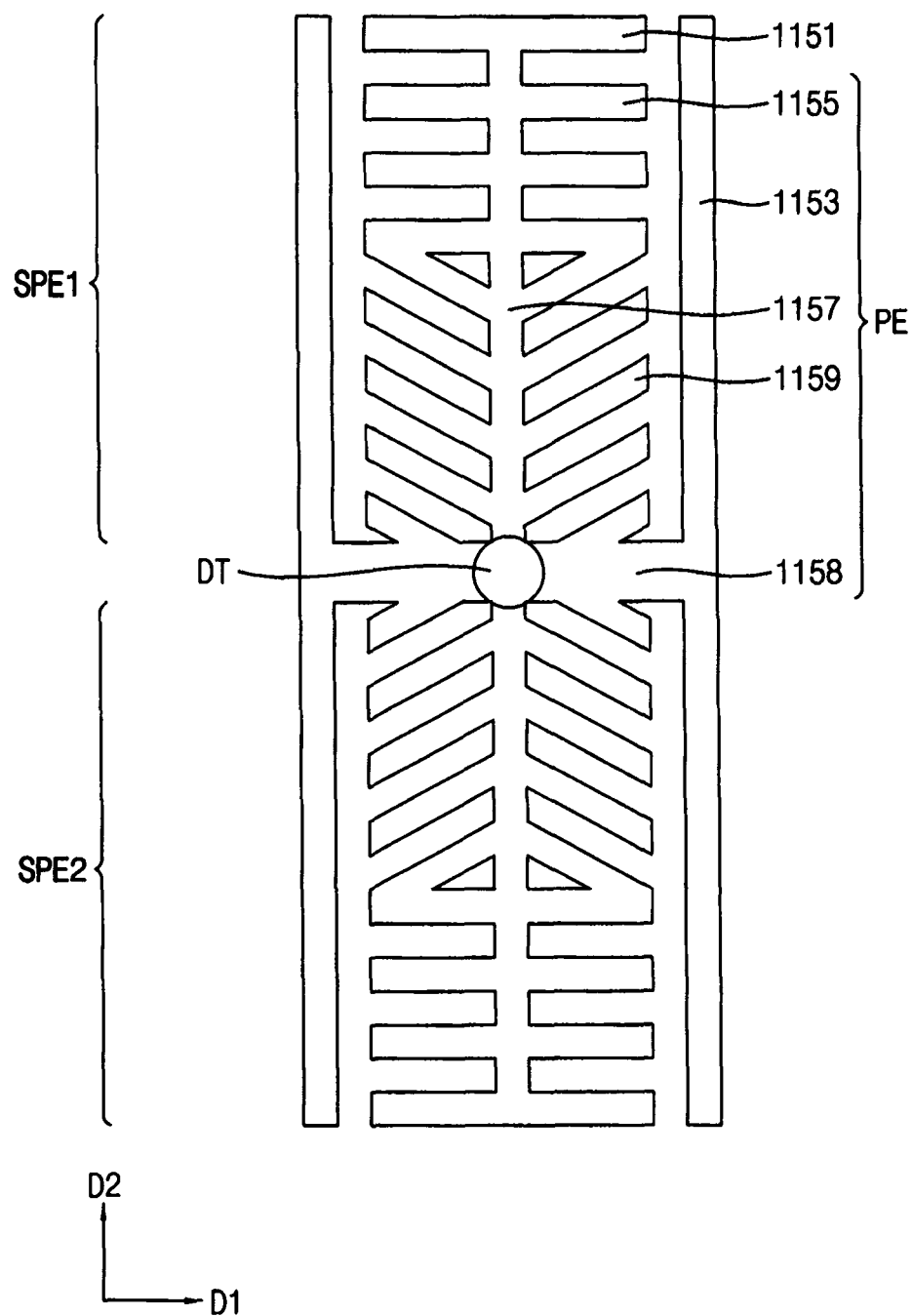
FIG. 32 is a plan view illustrating an exemplary embodiment of a pixel electrode and a concave pattern of a display substrate according to the invention.

FIG. 32 is a plan view illustrating a pixel electrode and a concave pattern of a display substrate according to an exemplary embodiment of the invention.

The pixel electrode PE according to the exemplary embodiment is substantially the same as the pixel electrode PE according to the aforementioned exemplary embodiment illustrated in FIG. 11 except for the concave pattern DT. Thus, the same or similar reference numerals will be used to refer to same or like parts as those described in the aforementioned exemplary embodiment and any further repetitive explanation concerning the above elements will be omitted.

Referring to FIGS. 23 and 32, the concave pattern DT is defined in the organic layer 1140. The concave pattern DT is defined by partially patterning the organic layer 1140. The concave pattern DT may be defined in an area corresponding to a central portion of a boundary area between the first sub pixel electrode SPE1 and the second sub pixel electrode SPE2. Thus, the concave pattern DT may be defined in an area corresponding to a central portion of a horizontal support electrode portion 1158.

In the illustrated exemplary embodiment, one concave pattern DT may be defined in the organic layer 1140. A thickness of the organic layer 1140 may be changed by the concave pattern DT. The concave pattern DT may control a liquid crystal particle disposed on the organic layer 1140, and thus the concave pattern DT may improve a side visibility.

Figure 33:
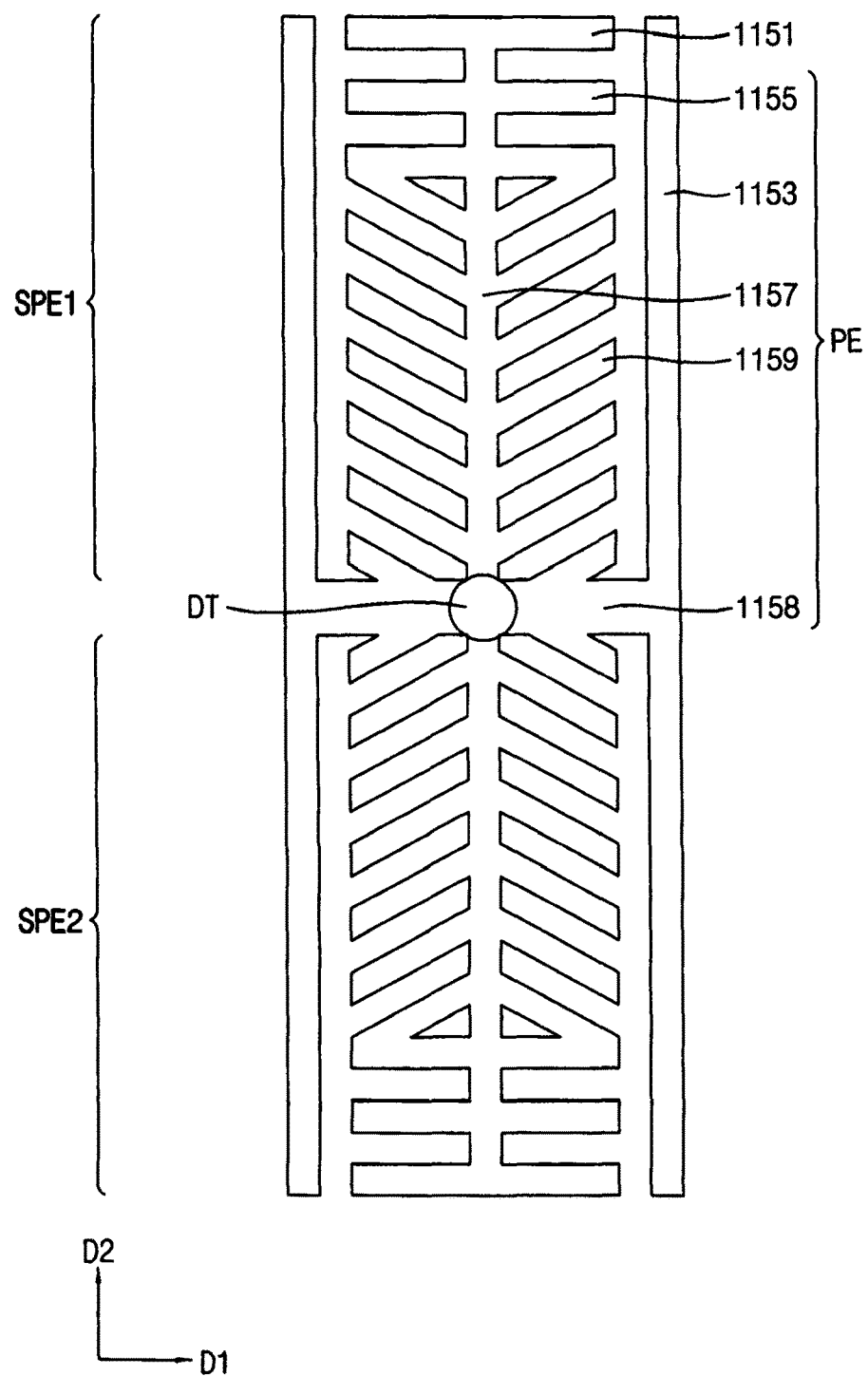
FIG. 33 is a plan view illustrating an exemplary embodiment of a pixel electrode and a concave pattern of a display substrate according to the invention.

FIG. 33 is a plan view illustrating a pixel electrode and a concave pattern of a display substrate according to an exemplary embodiment of the invention.

The pixel electrode PE according to the illustrated exemplary embodiment is substantially the same as the pixel electrode PE according to the aforementioned exemplary embodiment illustrated in FIG. 12 except for the concave pattern DT. Thus, the same or similar reference numerals will be used to refer to same or like parts as those described in the aforementioned exemplary embodiment and any further repetitive explanation concerning the above elements will be omitted.

Referring to FIGS. 23 and 33, the concave pattern DT is defined in the organic layer 1140. The concave pattern DT is defined by partially patterning the organic layer 1140. The concave pattern DT may be defined in an area corresponding to a central portion of a boundary area between the first sub pixel electrode SPE1 and the second sub pixel electrode SPE2. Thus, the concave pattern DT may be defined in an area corresponding to a central portion of a horizontal support electrode portion 1158.

In the illustrated exemplary embodiment, one concave pattern DT may be defined in the organic layer 1140. A thickness of the organic layer 1140 may be changed by the concave pattern DT. The concave pattern DT may control a liquid crystal particle provided on the organic layer 1140, and thus the concave pattern DT may improve a side visibility.

Figure 34:
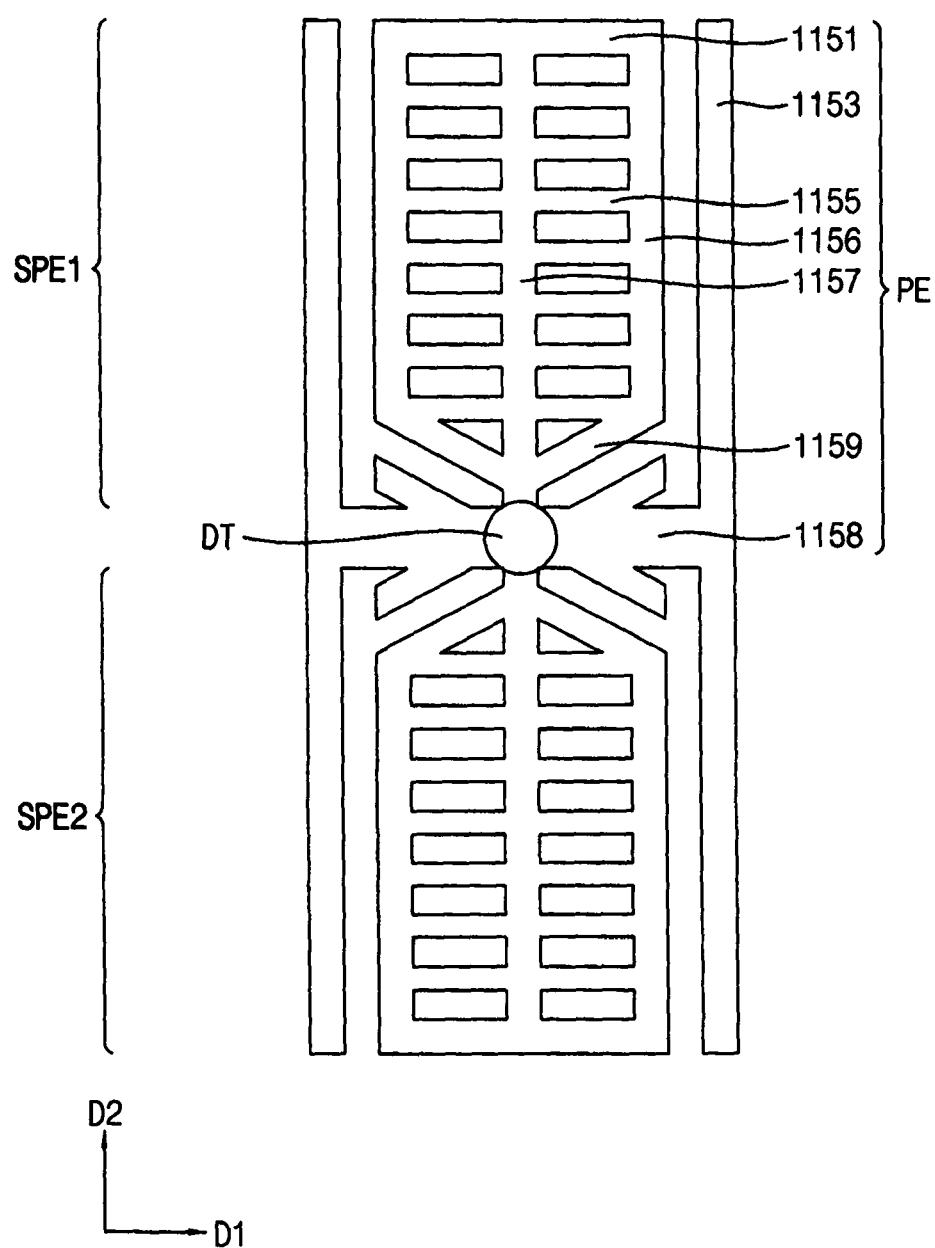
FIG. 34 is a plan view illustrating an exemplary embodiment of a pixel electrode and a concave pattern of a display substrate according to the invention.

FIG. 34 is a plan view illustrating a pixel electrode and a concave pattern of a display substrate according to an exemplary embodiment of the invention.

The pixel electrode PE according to the exemplary embodiment is substantially the same as the pixel electrode PE according to the aforementioned exemplary embodiment illustrated in FIG. 13 except for the concave pattern DT. Thus, the same or similar reference numerals will be used to refer to same or like parts as those described in the aforementioned exemplary embodiment and any further repetitive explanation concerning the above elements will be omitted.

Referring to FIGS. 23 and 34, the concave pattern DT is defined in the organic layer 1140. The concave pattern DT is defined by partially patterning the organic layer 1140. The concave pattern DT may be defined in an area corresponding to a central portion of a boundary area between the first sub pixel electrode SPE1 and the second sub pixel electrode SPE2. Thus, the concave pattern DT may be defined in an area corresponding to a central portion of a horizontal support electrode portion 1158.

In the illustrated exemplary embodiment, one concave pattern DT may be defined in the organic layer 1140. A thickness of the organic layer 1140 may be changed by the concave pattern DT. The concave pattern DT may control a liquid crystal particle provided on the organic layer 1140, and thus the concave pattern DT may improve a side visibility.

Figure 35:
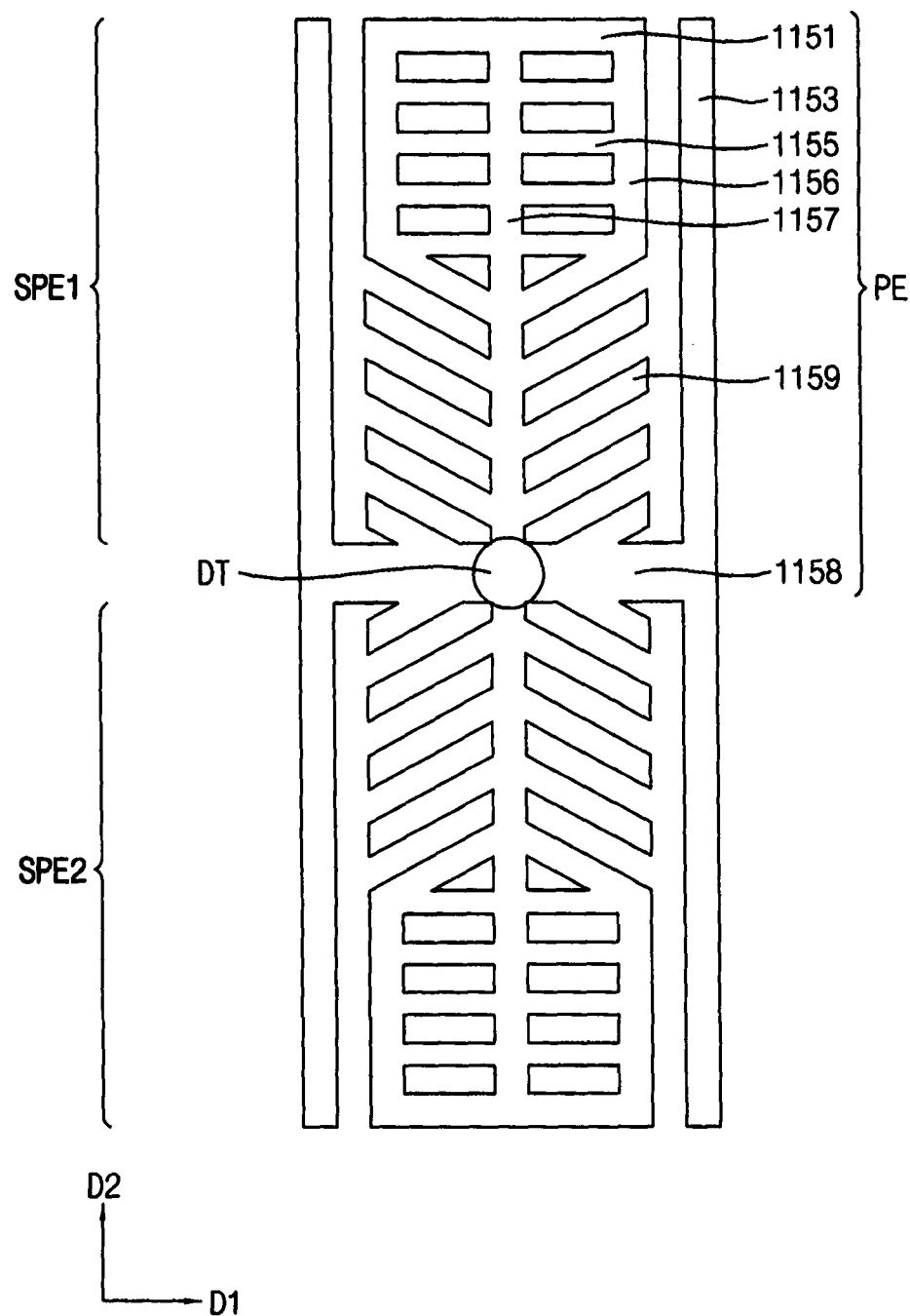
FIG. 35 is a plan view illustrating an exemplary embodiment of a pixel electrode and a concave pattern of a display substrate according to the invention.

FIG. 35 is a plan view illustrating a pixel electrode and a concave pattern of a display substrate according to an exemplary embodiment of the invention.

The pixel electrode PE according to the illustrated exemplary embodiment is substantially the same as the pixel electrode PE according to the aforementioned exemplary embodiment illustrated in FIG. 14 except for the concave pattern DT. Thus, the same or similar reference numerals will be used to refer to same or like parts as those described in the aforementioned exemplary embodiment and any further repetitive explanation concerning the above elements will be omitted.

Referring to FIGS. 23 and 35, the concave pattern DT is defined in the organic layer 1140. The concave pattern DT is defined by partially patterning the organic layer 1140. The concave pattern DT may be defined in an area corresponding to a central portion of a boundary area between the first sub pixel electrode SPE1 and the second sub pixel electrode SPE2. Thus, the concave pattern DT may be defined in an area corresponding to a central portion of a horizontal support electrode portion 1158.

In the illustrated exemplary embodiment, one concave pattern DT may be defined in the organic layer 1140. A thickness of the organic layer 1140 may be changed by the concave pattern DT. The concave pattern DT may control a liquid crystal particle provided on the organic layer 1140, and thus the concave pattern DT may improve a side visibility.

Figure 36:
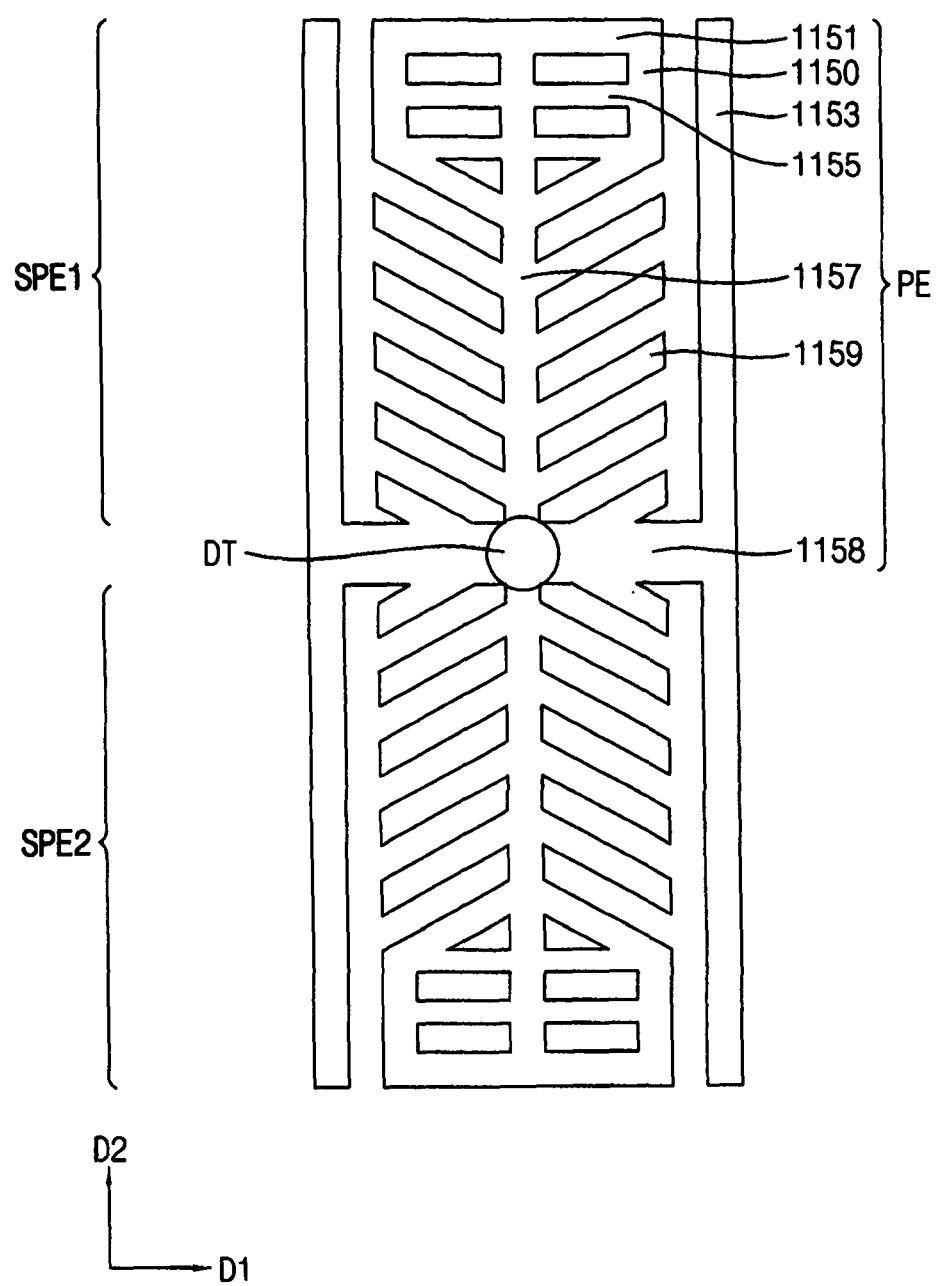
FIG. 36 is a plan view illustrating an exemplary embodiment of a pixel electrode and a concave pattern of a display substrate according to the invention.

FIG. 36 is a plan view illustrating a pixel electrode and a concave pattern of a display substrate according to an exemplary embodiment of the invention.

The pixel electrode PE according to the illustrated exemplary embodiment is substantially the same as the pixel electrode PE according to the aforementioned exemplary embodiment illustrated in FIG. 15 except for the concave pattern DT. Thus, the same or similar reference numerals will be used to refer to same or like parts as those described in the aforementioned exemplary embodiment and any further repetitive explanation concerning the above elements will be omitted.

Referring to FIGS. 23 and 36, the concave pattern DT is defined in the organic layer 1140. The concave pattern DT is defined by partially patterning the organic layer 1140. The concave pattern DT may be defined in an area corresponding to a central portion of a boundary area between the first sub pixel electrode SPE1 and the second sub pixel electrode SPE2. Thus, the concave pattern DT may be defined in an area corresponding to a central portion of a horizontal support electrode portion 1158.

In the illustrated exemplary embodiment, one concave pattern DT may be defined in the organic layer 1140. A thickness of the organic layer 1140 may be changed by the concave pattern DT. The concave pattern DT may control a liquid crystal particle disposed on the organic layer 1140, and thus the concave pattern DT may improve a side visibility.

Figure 37:
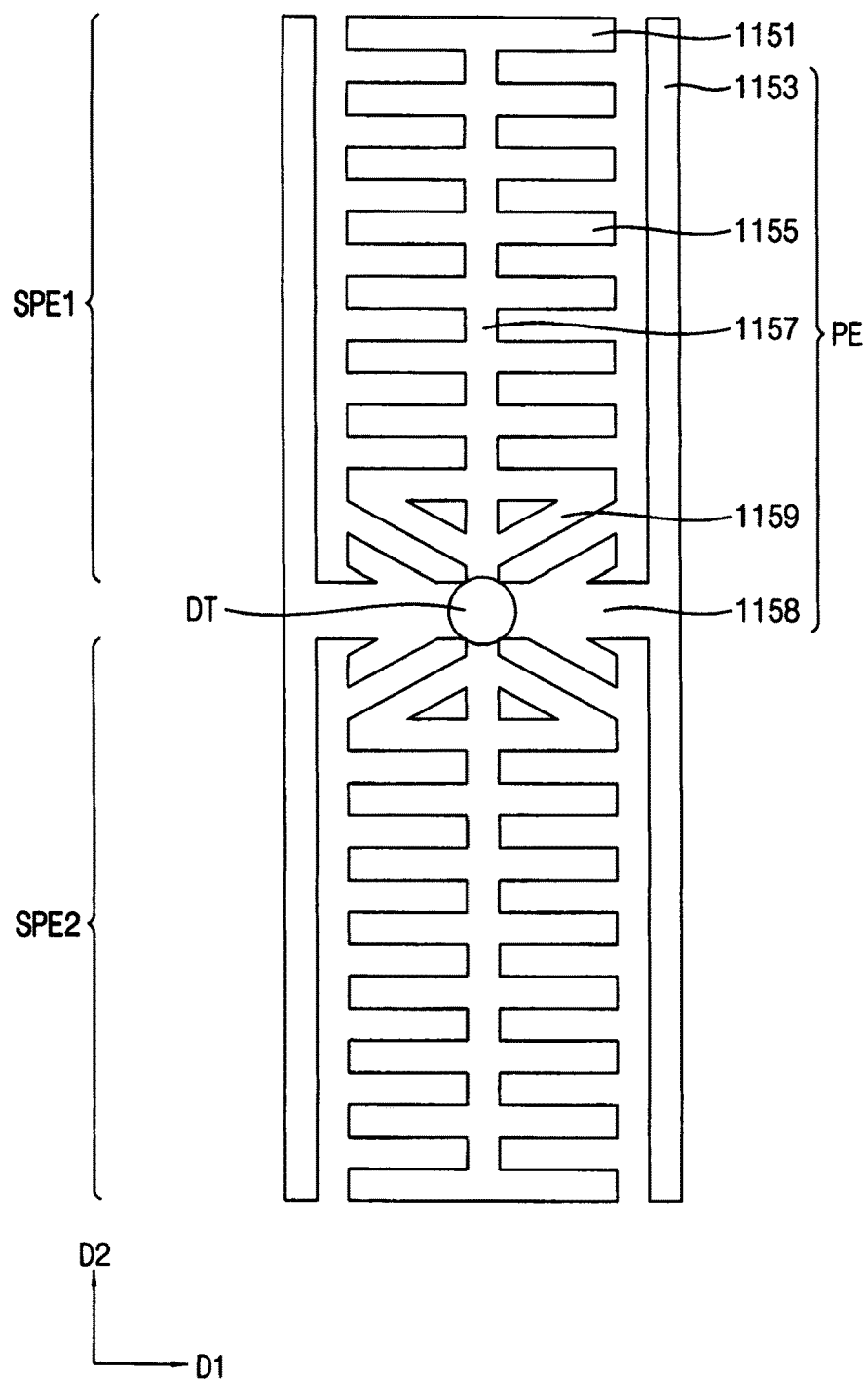
FIG. 37 is a plan view illustrating an exemplary embodiment of a pixel electrode and a concave pattern of a display substrate according to the invention.

FIG. 37 is a plan view illustrating a pixel electrode and a concave pattern of a display substrate according to an exemplary embodiment of the invention.

The pixel electrode PE according to the exemplary embodiment is substantially the same as the pixel electrode PE according to the aforementioned exemplary embodiment illustrated in FIG. 16 except for the concave pattern DT. Thus, the same or similar reference numerals will be used to refer to same or like parts as those described in the aforementioned exemplary embodiment and any further repetitive explanation concerning the above elements will be omitted.

Referring to FIGS. 23 and 37, the concave pattern DT is defined in the organic layer 1140. The concave pattern DT is defined by partially patterning the organic layer 1140. The concave pattern DT may be defined in an area corresponding to a central portion of a boundary area between the first sub pixel electrode SPE1 and the second sub pixel electrode SPE2. Thus, the concave pattern DT may be defined in an area corresponding to a central portion of a horizontal support electrode portion 1158.

In the illustrated exemplary embodiment, one concave pattern DT may be defined in the organic layer 1140. A thickness of the organic layer 1140 may be changed by the concave pattern DT. The concave pattern DT may control a liquid crystal particle disposed on the organic layer 1140, and thus the concave pattern DT may improve a side visibility.

Figure 38:
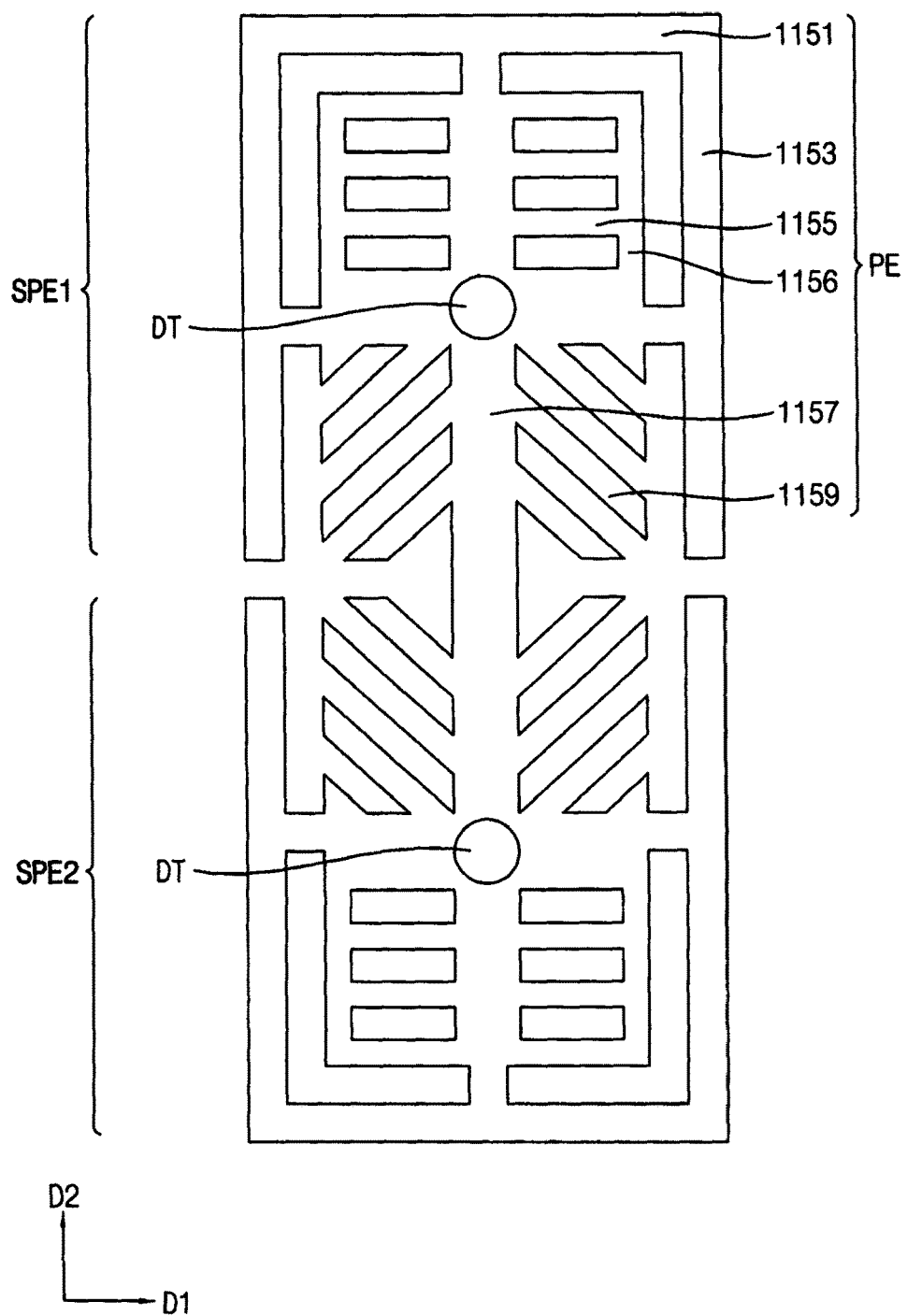
FIG. 38 is a plan view illustrating an exemplary embodiment of a pixel electrode and a concave pattern of a display substrate according to the invention.

FIG. 38 is a plan view illustrating a pixel electrode and a concave pattern of a display substrate according to an exemplary embodiment of the invention.

The pixel electrode PE according to the exemplary embodiment is substantially the same as the pixel electrode PE according to the aforementioned exemplary embodiment illustrated in FIG. 17 except for the concave pattern DT. Thus, the same or similar reference numerals will be used to refer to same or like parts as those described in the aforementioned exemplary embodiment and any further repetitive explanation concerning the above elements will be omitted.

Referring to FIGS. 23 and 38, the concave pattern DT is defined in the organic layer 1140. The concave pattern DT is defined by partially patterning the organic layer 1140. The concave pattern DT may be defined in an area corresponding to a boundary area between a horizontal internal branch electrode portion 1155 and an oblique internal branch electrode portion 1159 of the first sub pixel electrode SPE1, and an area corresponding to a boundary area between a horizontal internal branch electrode portion 1155 and an oblique internal branch electrode portion 1159 of the second sub pixel electrode SPE2.

In the illustrated exemplary embodiment, two concave patterns DT may be defined in the organic layer 1140. A thickness of the organic layer 1140 may be changed by the concave pattern DT. The concave pattern DT may control a liquid crystal particle disposed on the organic layer 1140, and thus the concave pattern DT may improve a side visibility.

Figure 39:
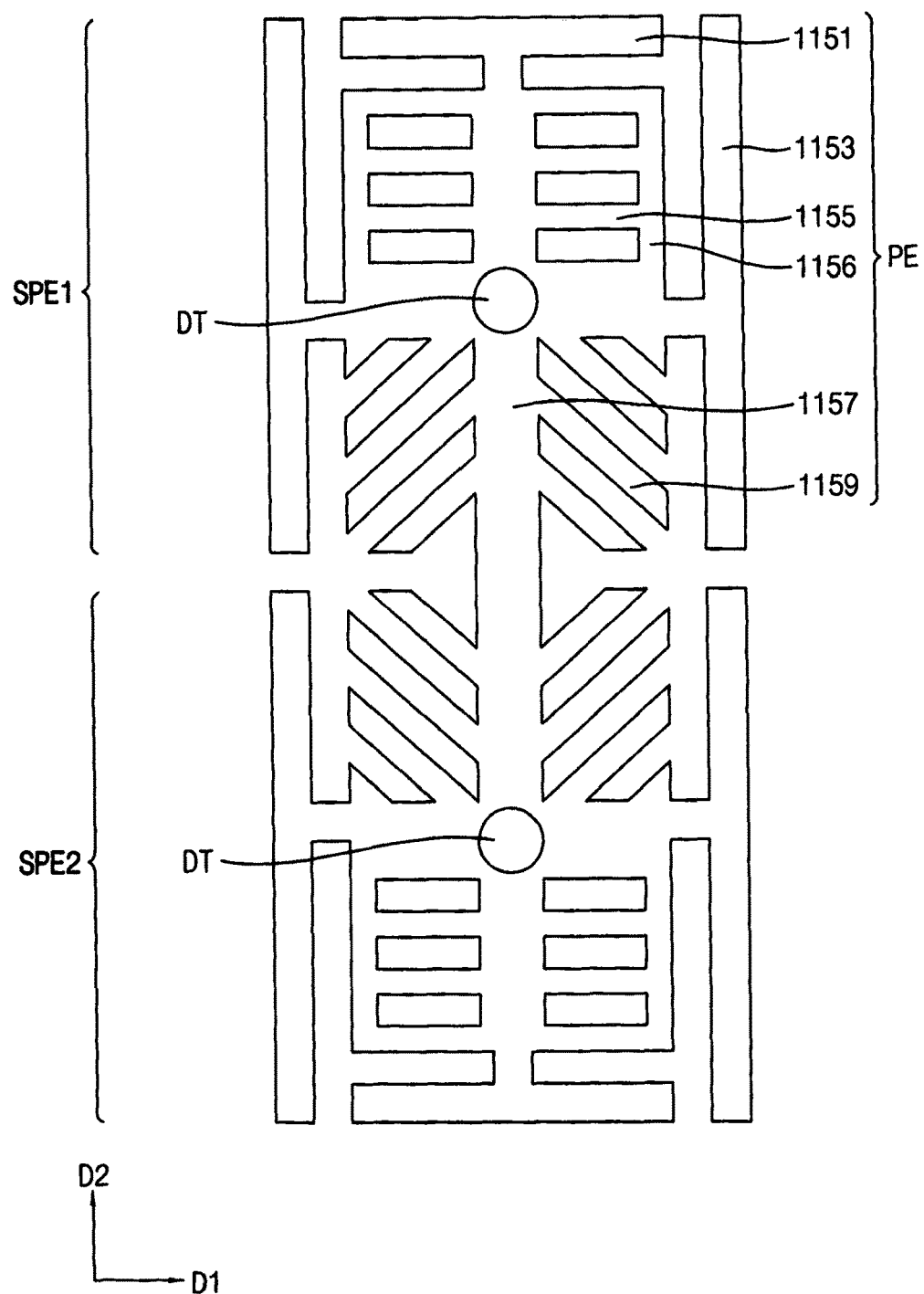
FIG. 39 is a plan view illustrating an exemplary embodiment of a pixel electrode and a concave pattern of a display substrate according to the invention.

FIG. 39 is a plan view illustrating a pixel electrode and a concave pattern of a display substrate according to an exemplary embodiment of the invention.

The pixel electrode PE according to the illustrated exemplary embodiment is substantially the same as the pixel electrode PE according to the aforementioned exemplary embodiment illustrated in FIG. 18 except for the concave pattern DT. Thus, the same or similar reference numerals will be used to refer to same or like parts as those described in the aforementioned exemplary embodiment and any further repetitive explanation concerning the above elements will be omitted.

Referring to FIGS. 23 and 39, the concave pattern DT is defined in the organic layer 1140. The concave pattern DT is defined by partially patterning the organic layer 1140. The concave pattern DT may be defined in an area corresponding to a boundary area between a horizontal internal branch electrode portion 1155 and an oblique internal branch electrode portion 1159 of the first sub pixel electrode SPE1, and an area corresponding to a boundary area between a horizontal internal branch electrode portion 1155 and an oblique internal branch electrode portion 1159 of the second sub pixel electrode SPE2.

In the illustrated exemplary embodiment, two concave patterns DT may be defined in the organic layer 1140. A thickness of the organic layer 1140 may be changed by the concave pattern DT. The concave pattern DT may control a liquid crystal particle disposed on the organic layer 1140, and thus the concave pattern DT may improve a side visibility.

Figure 40:
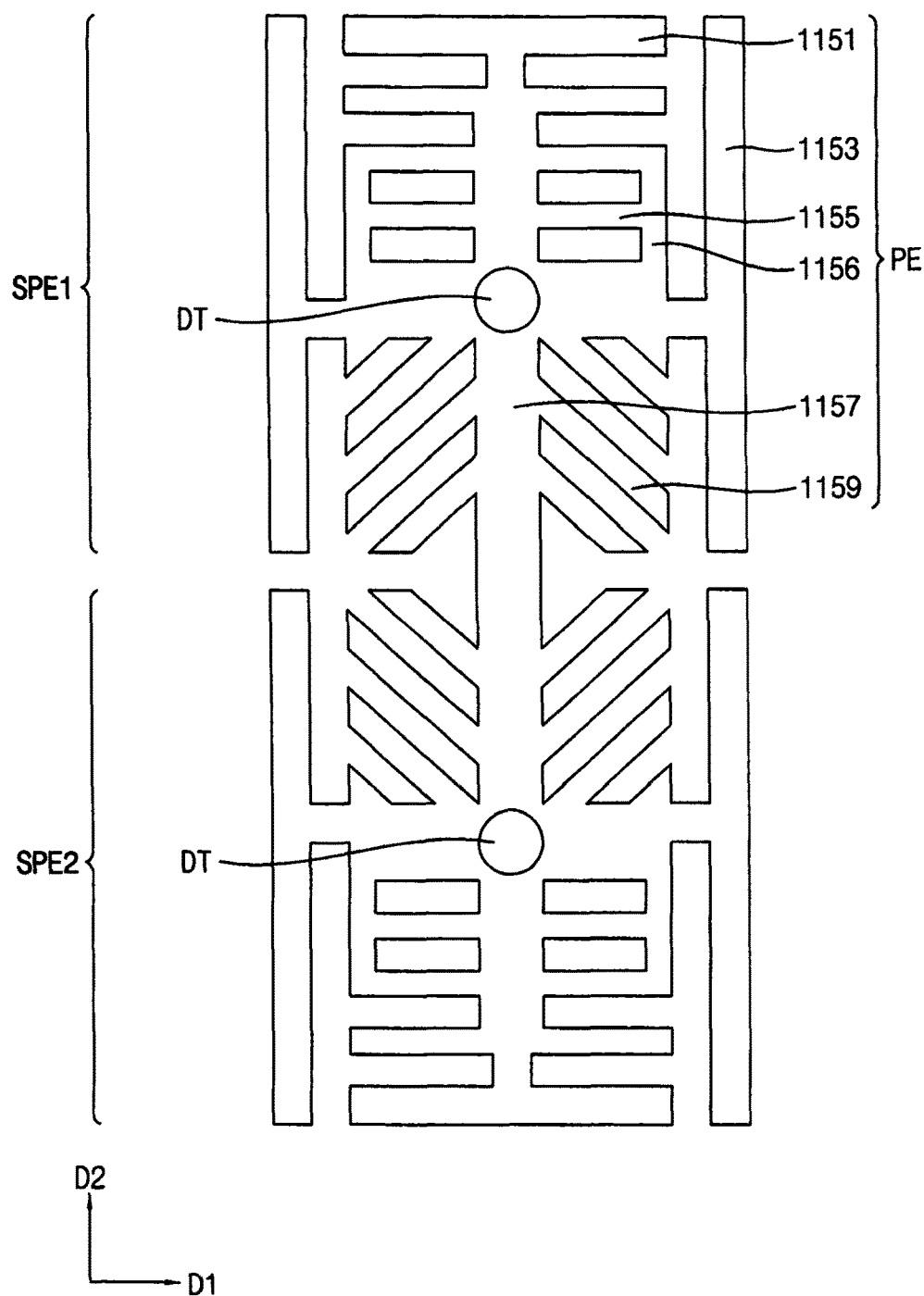
FIG. 40 is a plan view illustrating an exemplary embodiment of a pixel electrode and a concave pattern of a display substrate according to the invention.

FIG. 40 is a plan view illustrating a pixel electrode and a concave pattern of a display substrate according to an exemplary embodiment of the invention.

The pixel electrode PE according to the illustrated exemplary embodiment is substantially the same as the pixel electrode PE according to the aforementioned exemplary embodiment illustrated in FIG. 19 except for the concave pattern DT. Thus, the same or similar reference numerals will be used to refer to same or like parts as those described in the aforementioned exemplary embodiment and any further repetitive explanation concerning the above elements will be omitted.

Referring to FIGS. 23 and 40, the concave pattern DT is defined in the organic layer 1140. The concave pattern DT is defined by partially patterning the organic layer 1140. The concave pattern DT may be defined in an area corresponding to a boundary area between a horizontal internal branch electrode portion 1155 and an oblique internal branch electrode portion 1159 of the first sub pixel electrode SPE1, and an area corresponding to a boundary area between a horizontal internal branch electrode portion 1155 and an oblique internal branch electrode portion 1159 of the second sub pixel electrode SPE2.

In the illustrated exemplary embodiment, two concave patterns DT may be defined in the organic layer 1140. A thickness of the organic layer 1140 may be changed by the concave pattern DT. The concave pattern DT may control a liquid crystal particle disposed on the organic layer 1140, and thus the concave pattern DT may improve a side visibility.

Figure 41:
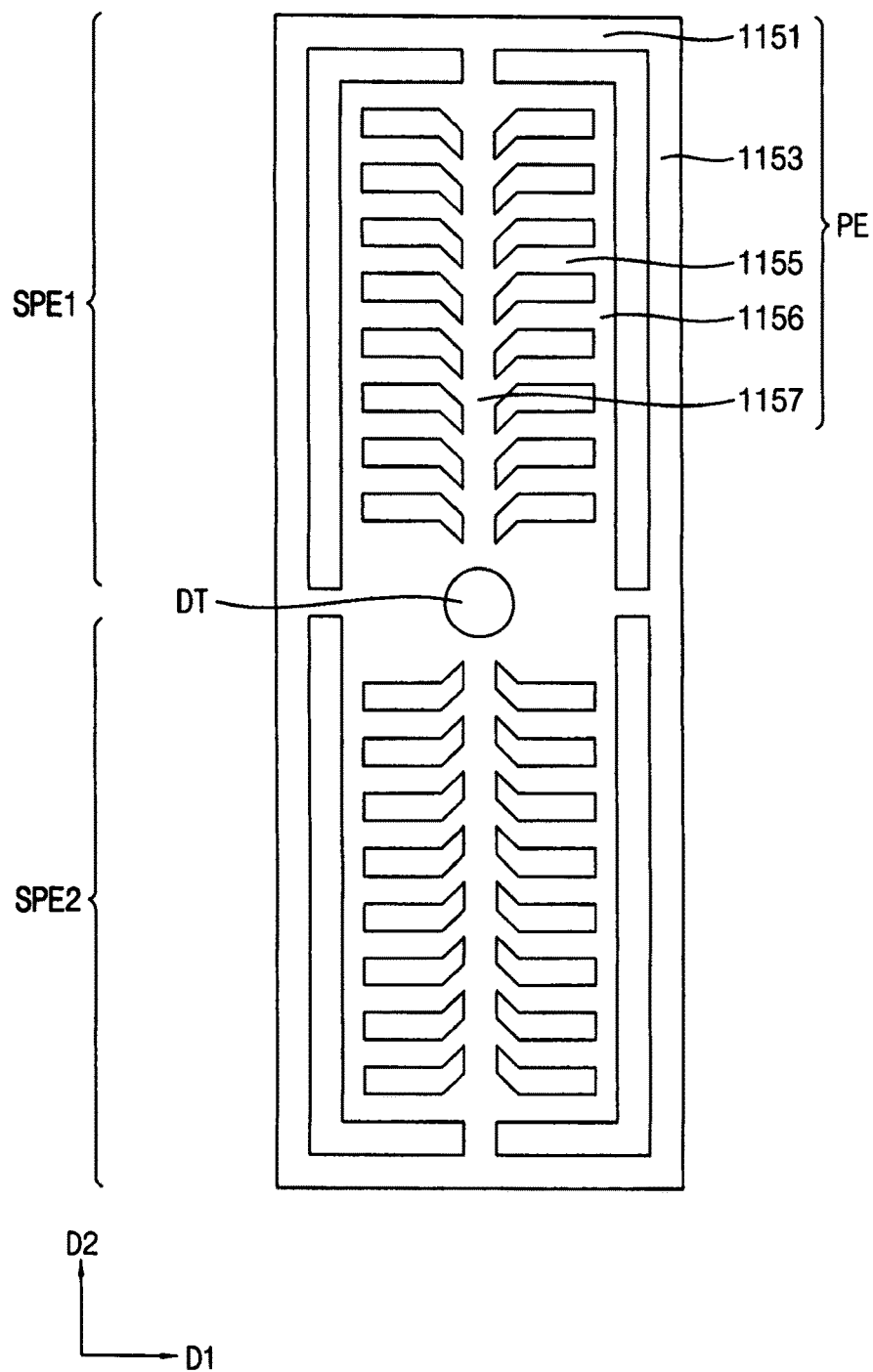
FIG. 41 is a plan view illustrating an exemplary embodiment of a pixel electrode and a concave pattern of a display substrate according to the invention.

FIG. 41 is a plan view illustrating a pixel electrode and a concave pattern of a display substrate according to an exemplary embodiment of the invention.

The pixel electrode PE according to the illustrated exemplary embodiment is substantially the same as the pixel electrode PE according to the aforementioned exemplary embodiment illustrated in FIG. 20 except for the concave pattern DT. Thus, the same or similar reference numerals will be used to refer to same or like parts as those described in the aforementioned exemplary embodiment and any further repetitive explanation concerning the above elements will be omitted.

Referring to FIGS. 23 and 41, the concave pattern DT is defined in the organic layer 1140. The concave pattern DT is defined by partially patterning the organic layer 1140. The concave pattern DT may be defined in an area corresponding to a central portion of a boundary area between the first sub pixel electrode SPE1 and the second sub pixel electrode SPE2.

In the illustrated exemplary embodiment, one concave pattern DT may be defined in the organic layer 1140. A thickness of the organic layer 1140 may be changed by the concave pattern DT. The concave pattern DT may control a liquid crystal particle disposed on the organic layer 1140, and thus the concave pattern DT may improve a side visibility.

Figure 42:
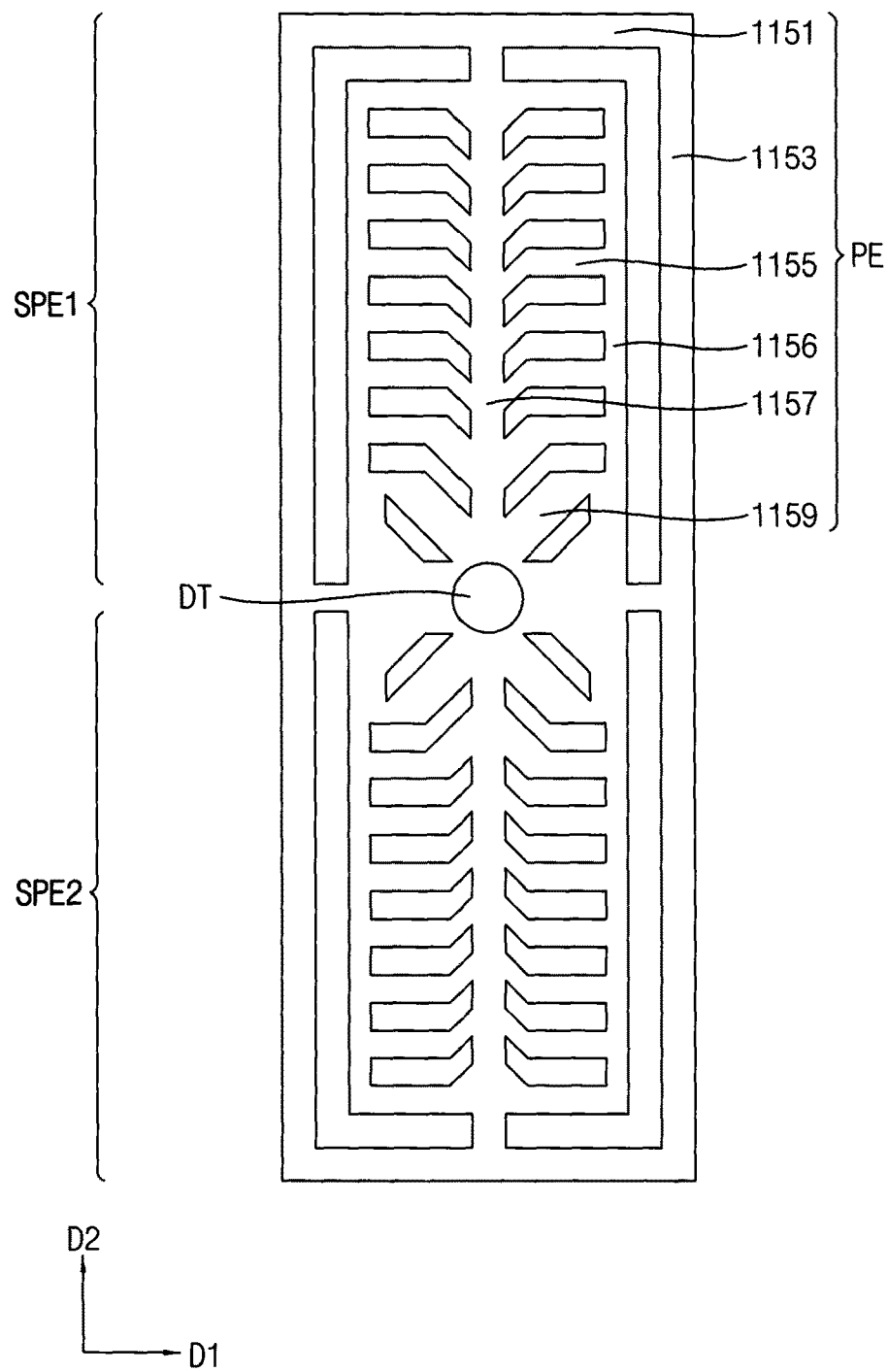
FIG. 42 is a plan view illustrating an exemplary embodiment of a pixel electrode and a concave pattern of a display substrate according to the invention.

FIG. 42 is a plan view illustrating a pixel electrode and a concave pattern of a display substrate according to an exemplary embodiment of the invention.

The pixel electrode PE according to the illustrated exemplary embodiment is substantially the same as the pixel electrode PE according to the aforementioned exemplary embodiment illustrated in FIG. 21 except for the concave pattern DT. Thus, the same or similar reference numerals will be used to refer to same or like parts as those described in the aforementioned exemplary embodiment and any further repetitive explanation concerning the above elements will be omitted.

Referring to FIGS. 23 and 42, the concave pattern DT is defined in the organic layer 1140. The concave pattern DT is defined by partially patterning the organic layer 1140. The concave pattern DT may be defined in an area corresponding to a central portion of a boundary area between the first sub pixel electrode SPE1 and the second sub pixel electrode SPE2.

In the illustrated exemplary embodiment, one concave pattern DT may be defined in the organic layer 1140. A thickness of the organic layer 1140 may be changed by the concave pattern DT. The concave pattern DT may control a liquid crystal particle disposed on the organic layer 1140, and thus the concave pattern DT may improve a side visibility.

According to the illustrated exemplary embodiments, a pixel electrode of a display substrate includes a first sub pixel electrode and a second sub pixel electrode, and the pixel electrode has a division structure divided into four or eight areas. Thus, a gamma mixture effect may be generated, and thus a side visibility may be improved.

In addition, an organic layer disposed under a pixel electrode includes a concave pattern. Therefore, a thickness of a liquid crystal layer may be controlled differently by the concave pattern. Accordingly, a liquid crystal particle of the liquid crystal layer may be controlled, and thus a side visibility may be improved.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A display substrate comprising:
   a base substrate;
   a switching device disposed on the base substrate, and comprising:
     a gate electrode electrically connected to a gate line extending in a first direction;
     a source electrode electrically connected to a data line extending in a second direction perpendicular to the first direction; and
     a drain electrode spaced apart from the source electrode; and
   a pixel electrode electrically connected to the switching device, and comprising:
     a first sub pixel electrode comprising:
       an internal electrode comprising:
         a support electrode portion extending in the second direction; and
         a horizontal internal branch electrode portion extending in the first direction; and
       an external electrode comprising:
         a horizontal external branch electrode portion disposed outside the internal electrode and extending in the first direction; and
         a vertical external branch electrode portion disposed outside the internal electrode and extending in the second direction; and
     a second sub pixel electrode adjacent to the first sub pixel electrode and having a shape symmetrical to that of the first sub pixel electrode.

2. The display substrate of claim 1, further comprising:
   a vertical internal branch electrode portion connecting end portions of the horizontal internal branch electrode portion.

3. The display substrate of claim 2, wherein an end portion of the horizontal external branch electrode portion is connected to an end portion of the vertical external branch electrode portion.

4. The display substrate of claim 2, wherein an end portion of the horizontal external branch electrode portion is connected to an end portion of the vertical internal branch electrode portion.

5. The display substrate of claim 1, further comprising:
   an oblique internal branch electrode portion connected to the support electrode portion and extending in a third direction different from the first and second directions.

6. The display substrate of claim 5, further comprising:
   a horizontal support electrode portion extending in the first direction and disposed in a boundary area of the first sub pixel electrode and the second sub pixel electrode.

7. The display substrate of claim 6, wherein the oblique internal branch electrode portion extends from the support electrode portion and is inclined in a direction far from the horizontal support electrode portion.

8. The display substrate of claim 5, wherein the oblique internal branch electrode portion is inclined in a direction far from the horizontal internal branch electrode portion.

9. The display substrate of claim 1, wherein the horizontal internal branch electrode portion comprises:
a horizontal portion extending in the first direction; and
an oblique portion extending from the horizontal portion in a third direction different from the first and second directions.

10. The display substrate of claim 9, further comprising:
an oblique internal branch electrode portion extending in a direction parallel to the oblique portion.

11. The display substrate of claim 9, further comprising:
a color filter layer disposed on the switching device.

12. The display substrate of claim 11, further comprising:
an organic layer which is disposed on the color filter layer and in which a concave pattern is defined.

13. The display substrate of claim 12, wherein the concave pattern is defined in an area corresponding to a central portion of the first sub pixel electrode and a central portion of the second sub pixel electrode.

14. The display substrate of claim 12, wherein the concave pattern is provided in an area corresponding to a central portion of a boundary area of the first sub pixel electrode and the second sub pixel electrode.

15. A method of manufacturing a display substrate, the method comprising:
forming a switching device comprising:
a gate electrode electrically connected to a gate line extending in a first direction;
a source electrode electrically connected to a data line extending in a second direction perpendicular to the first direction; and
a drain electrode spaced apart from the source electrode, on a base substrate; and
forming a pixel electrode on the base substrate on which the switching device is disposed, the pixel electrode comprising:
a first sub pixel electrode comprising:
an internal electrode comprising:
a support electrode portion extending in the second direction; and
a horizontal internal branch electrode portion extending in the first direction; and
an external electrode comprising:
a horizontal external branch electrode portion disposed outside the internal electrode and extending in the first direction; and
a vertical external branch electrode portion disposed outside the internal electrode and extending in the second direction; and
a second sub pixel electrode adjacent to the first sub pixel electrode and having a shape symmetrical to that of the first sub pixel electrode.

16. The method of claim 15, wherein the pixel electrode further comprises an oblique internal branch electrode portion connected to the support electrode portion and extending in a third direction different from the first and second directions.

17. The method of claim 15, further comprising:
forming a color filter layer on the switching device.

18. The method of claim 17, further comprising:
forming an organic layer on the color filter layer; and
defining a concave pattern by patterning the organic layer.

19. The method of claim 18, wherein the concave pattern is defined in an area corresponding to a central portion of the first sub pixel electrode and a central portion of the second sub pixel electrode.

20. The method of claim 18, wherein the concave pattern is defined in an area corresponding to a central portion of a boundary area of the first sub pixel electrode and the second sub pixel electrode.

* * * * *